United States Patent
Kurokawa et al.

(10) Patent No.: US 11,270,728 B2
(45) Date of Patent: Mar. 8, 2022

(54) MAGNETIC RECORDING MEDIUM HAVING CHARACTERIZED BACK COATING LAYER AND MAGNETIC RECORDING AND REPRODUCING APPARATUS

(71) Applicant: FUJIFILM Corporation, Tokyo (JP)

(72) Inventors: Takuto Kurokawa, Minami-ashigara (JP); Naoki Sano, Minami-ashigara (JP); Norihito Kasada, Minami-ashigara (JP); Eiki Ozawa, Minami-ashigara (JP); Megumi Nakano, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/022,446

(22) Filed: Sep. 16, 2020

(65) Prior Publication Data
US 2021/0090600 A1    Mar. 25, 2021

(30) Foreign Application Priority Data
Sep. 19, 2019   (JP) .............................. JP2019-170511

(51) Int. Cl.
| G11B 5/735 | (2006.01) |
| G11B 5/733 | (2006.01) |
| G11B 5/73 | (2006.01) |
| G11B 5/78 | (2006.01) |

(52) U.S. Cl.
CPC ............ *G11B 5/7356* (2019.05); *G11B 5/733* (2013.01); *G11B 5/73929* (2019.05); *G11B 5/78* (2013.01)

(58) Field of Classification Search
None
See application file for complete search history.

(56) References Cited

U.S. PATENT DOCUMENTS

| 10,811,048 B2 * | 10/2020 | Ozawa ............... G11B 5/70684 |
| 2012/0045664 A1 | 2/2012 | Tanaka et al. |
| 2020/0090694 A1 * | 3/2020 | Sano ....................... G11B 5/845 |
| 2020/0279580 A1 * | 9/2020 | Sano .................. G11B 5/70678 |
| 2021/0090602 A1 * | 3/2021 | Sano ....................... G11B 5/733 |
| 2021/0241792 A1 * | 8/2021 | Kurokawa ............. G11B 5/714 |

FOREIGN PATENT DOCUMENTS

JP    2012-043495 A    3/2012

* cited by examiner

*Primary Examiner* — Kevin M Bernatz
(74) *Attorney, Agent, or Firm* — Sughrue Mion, PLLC

(57) ABSTRACT

The magnetic recording medium includes a non-magnetic support; a magnetic layer that includes ferromagnetic powder on one surface side of the non-magnetic support; and a back coating layer that includes non-magnetic powder on the other surface side of the non-magnetic support, in which a difference between a spacing measured on a surface of the back coating layer by optical interferometry under a pressure of 0.5 atm after n-hexane cleaning and a spacing measured on the surface of the back coating layer by optical interferometry under a pressure of 13.5 atm after n-hexane cleaning is 3 nm or less.

18 Claims, No Drawings

MAGNETIC RECORDING MEDIUM HAVING CHARACTERIZED BACK COATING LAYER AND MAGNETIC RECORDING AND REPRODUCING APPARATUS

CROSS-REFERENCE TO RELATED APPLICATIONS

This application claims priority under 35 U.S.C. 119 to Japanese Patent Application No. 2019-170511 filed on Sep. 19, 2019. The above application is hereby expressly incorporated by reference, in its entirety, into the present application.

BACKGROUND OF THE INVENTION

1. Field of the Invention

The present invention relates to a magnetic recording medium and a magnetic recording and reproducing apparatus.

2. Description of the Related Art

For a magnetic recording medium, a back coating layer is provided on a surface side of a non-magnetic support opposite to a surface side provided with a magnetic layer (for example, see paragraphs 0040 to 0044 of JP2012-043495A).

SUMMARY OF THE INVENTION

In recent years, a magnetic recording medium is stored and used in various environments. For example, the magnetic recording medium may be stored in a temperature-controlled data center. However, from a viewpoint of reducing a cost of air conditioning for temperature control, it is desirable that temperature control conditions during storage can be more relaxed than a current level, or the control can be made unnecessary. In view of the above description, the present inventor studied a performance of the magnetic recording medium after being stored under an environment of a high temperature. As a result of this study, it was found that a magnetic recording medium including a back coating layer has a problem that reproduction output is decreased in a case where reproduction is repeated under an environment of a low temperature and a high humidity after storage under an environment of a high temperature.

An aspect of the present invention provides for a magnetic recording medium including a back coating layer, in which a decrease in reproduction output is small even though reproduction is repeated under an environment of a low temperature and a high humidity after storage under an environment of a high temperature.

An aspect of the present invention relates to a magnetic recording medium comprising: a non-magnetic support; a magnetic layer that includes ferromagnetic powder on one surface side of the non-magnetic support; and a back coating layer that includes non-magnetic powder on the other surface side of the non-magnetic support, in which a difference ($S_{0.5}-S_{13.5}$) between a spacing $S_{0.5}$ measured on a surface of the back coating layer by optical interferometry under a pressure of 0.5 atm after n-hexane cleaning and a spacing $S_{13.5}$ measured on the surface of the back coating layer by optical interferometry under a pressure of 13.5 atm after n-hexane cleaning is 3 nm or less. Hereinafter, the difference ($S_{0.5}-S_{13.5}$) will be simply referred to as a "difference". In addition, 1 atm=101325 Pa (Pascal).

In an embodiment, the difference may be 1 nm or more and 3 nm or less.

In an embodiment, $S_{0.5}$ may be 20 nm or more and 90 nm or less.

In an embodiment, $S_{13.5}$ may be 20 nm or more and 90 nm or less.

In an embodiment, the back coating layer may include an inorganic oxide-based particle.

In an embodiment, the inorganic oxide-based particle may be a composite particle of an inorganic oxide and a polymer.

In an embodiment, the back coating layer may have a thickness of 0.5 μm or less.

In an embodiment, the magnetic recording medium may further comprise a non-magnetic layer including non-magnetic powder between the non-magnetic support and the magnetic layer.

In an embodiment, the magnetic recording medium may be a magnetic tape.

Another aspect of the present invention relates to a magnetic recording and reproducing apparatus comprising: the magnetic recording medium described above; and a magnetic head.

According to an aspect of the present invention, it is possible to provide a magnetic recording medium including a back coating layer, in which a decrease in reproduction output is small even though reproduction is repeated under an environment of a low temperature and a high humidity after storage under an environment of a high temperature. According to an aspect of the present invention, it is possible to provide a magnetic recording and reproducing apparatus including such a magnetic recording medium.

DESCRIPTION OF THE PREFERRED EMBODIMENTS

Magnetic Recording Medium

An aspect of the present invention relates to a magnetic recording medium comprising: a non-magnetic support; a magnetic layer that includes ferromagnetic powder on one surface side of the non-magnetic support; and a back coating layer that includes non-magnetic powder on the other surface side of the non-magnetic support, in which a difference ($S_{0.5}-S_{13.5}$) between a spacing $S_{0.5}$ measured on a surface of the back coating layer by optical interferometry under a pressure of 0.5 atm after n-hexane cleaning and a spacing $S_{13.5}$ measured on the surface of the back coating layer by optical interferometry under a pressure of 13.5 atm after n-hexane cleaning is 3 nm or less.

In the present invention and this specification, "n-hexane cleaning" means that a sample piece cut out from a magnetic recording medium is immersed in fresh n-hexane (200 g) at a liquid temperature of 20° C. to 25° C. and ultrasonically cleaned for 100 seconds (ultrasonic output: 40 kHz). In a case where a magnetic recording medium to be cleaned is a magnetic tape, a sample piece having a length of 5 cm is cut out and subjected to n-hexane cleaning. A width of the magnetic tape and a width of the sample piece cut from the magnetic tape are usually ½ inches. 1 inch=0.0254 meters. For also magnetic tapes other than that having ½ inches width, a sample piece having a length of 5 cm may be cut out and subjected to n-hexane cleaning. In a case where a magnetic recording medium to be cleaned is a magnetic disk, a sample piece having a size of 5 cm×1.27 cm is cut out and subjected to n-hexane cleaning. A measurement of a spacing which will be described in detail below is performed after a sample piece after n-hexane cleaning is left under an environment of a temperature of 23° C. and a relative humidity of 50% for 24 hours.

In the present invention and this specification, the "back coating layer surface (surface of the back coating layer)" of the magnetic recording medium has the same meaning as a surface of the magnetic recording medium on a back coating layer side.

In the present invention and this specification, a spacing measured on the back coating layer surface of the magnetic recording medium by optical interferometry is a value measured by the following method.

In a state where the magnetic recording medium (specifically, the above sample piece. The same applies hereinafter.) and a transparent plate member (for example, a glass plate or the like) are superposed such that the back coating layer surface of the magnetic recording medium faces the transparent plate member, a pressing member is pressed at a pressure of 0.5 atm or 13.5 atm from a side of the magnetic recording medium opposite to a side of the back coating layer. In this state, the back coating layer of the magnetic recording medium is irradiated with light through the transparent plate member (irradiation region: 150,000 to 200,000 $\mu m^2$), and a spacing (distance) between the back coating layer surface of the magnetic recording medium and a surface of the transparent plate member on the magnetic recording medium side is obtained based on an intensity (for example, a contrast of an interference fringe image) of interference light generated by an optical path difference between reflected light from the back coating layer surface of the magnetic recording medium and reflected light from the surface of the transparent plate member on the magnetic recording medium side. Here, emitted light is not particularly limited. In a case where emitted light is light having a light emission wavelength over a relatively wide wavelength range, such as white light having light with a plurality of wavelengths, a member, such as an interference filter, which has a function of selectively cutting light with a specific wavelength or light out of a specific wavelength region is disposed between the transparent plate member and a light receiving section that receives reflected light, and light of some wavelengths or light in some wavelength regions in reflected light is selectively incident on the light receiving section. In a case where emitted light is light having a single emission peak (so-called monochromatic light), the member may not be used. As an example, a wavelength of light incident on the light receiving section can be in a range of 500 to 700 nm, for example. However, a wavelength of light incident on the light receiving section is not limited to the above range. Moreover, the transparent plate member may be a member having transparency which allows emitted light to pass therethrough to such an extent that the interference light can be obtained by irradiating the magnetic recording medium with light through this member.

An interference fringe image obtained by the above spacing measurement is divided into 300,000 points to obtain a spacing of each point (a distance between the back coating layer surface of the magnetic recording medium and the surface of the transparent plate member on the magnetic recording medium side), and thus this is used as a histogram and a mode value in the histogram is used as a spacing.

Five sample pieces are cut out from the same magnetic recording medium, and after n-hexane cleaning for each sample piece, a pressing member is pressed at a pressure of 0.5 atm to obtain a spacing, and further, a pressing member is pressed at a pressure of 13.5 atm to obtain a spacing. Then, an arithmetic average of the spacings obtained under a pressure of 0.5 atm after n-hexane cleaning for the five sample pieces is defined as a spacing $S_{0.5}$, and an arithmetic average of the spacings obtained under a pressure of 13.5 atm after n-hexane cleaning for the five sample pieces is defined as a spacing $S_{13.5}$. A difference ($S_{0.5}-S_{13.5}$) between $S_{0.5}$ and $S_{13.5}$ thus obtained is defined as a difference ($S_{0.5}-S_{13.5}$) for the magnetic recording medium.

The above measurement can be performed using, for example, a commercially available tape spacing analyzer (tape spacing analyzer; TSA) such as tape spacing analyzer manufactured by Micro Physics. Spacing measurement in Examples was performed using a tape spacing analyzer manufactured by Micro Physics.

In the magnetic recording medium, a difference ($S_{0.5}-S_{13.5}$) between a spacing $S_{0.5}$ measured under a pressure of 0.5 atm and a spacing $S_{13.5}$ measured under a pressure of 13.5 atm on the surface of the back coating layer by optical interferometry after n-hexane cleaning is 3 nm or less. Therefore, according to the magnetic recording medium, it is possible to suppress a decrease in reproduction output during repeated reproduction under an environment of a low temperature and a high humidity after storage under an environment of a high temperature. Supposition of the present inventor regarding this point is as follows.

It is supposed that a decrease in reproduction output during repeated reproduction is caused by reduction of a component (for example, a lubricant described later) that can contribute to running stability from a magnetic layer during storage before reproduction start. For example, it is considered that in a case where a magnetic layer surface and the back coating layer surface come into contact with each other during storage, the above component is transferred from the magnetic layer surface to the back coating layer side, and thus is reduced from the magnetic layer. It is considered that, during storage under an environment of a high temperature, the back coating layer surface is likely to receive a high pressure from the magnetic layer surface due to, for example, occurrence of winding tightness in the magnetic recording medium (for example, a magnetic tape) in a state of being wound around a reel and accommodated in a cartridge, and therefore, it is supposed that the amount of the above component transferred from the magnetic layer surface to the back coating layer side increases. Furthermore, since running stability tends to decrease under an environment of a low temperature and a high humidity, it is supposed that in a case where the data recorded in the magnetic layer in which the above component is reduced during storage is repeatedly reproduced under an environment of a low temperature and a high humidity, reproduction output is likely to decrease. The high temperature may be, for example, a temperature of about 30° C. to 50° C., the low temperature may be, for example, a temperature of about 0° C. to 15° C., and the high humidity may be, for example, a relative humidity of about 70% to 100%.

With respect to the above points, the present inventor has made intensive studies, and as a result, the present inventor considered that suppression of deformation of the back coating layer surface under a high pressure contributes to suppression of a large amount of transfer of the above component from the magnetic layer surface to the back coating layer surface during storage under an environment of a high temperature. Details are as follows.

On the back coating layer surface, usually, a protrusion formed of non-magnetic powder included in the back coating layer can be present in a state of being embedded in a base portion of the back coating layer. It is supposed that in a case where the protrusion sinks deeply into the back coating layer under a high pressure, a fine gap is generated between the protrusion and the base portion of the back coating layer. It is considered that the above component enters into the fine gap by capillary action, which increase the amount of the above component transferred to the back coating layer surface. Therefore, the present inventor considered that suppression of deformation of the back coating layer surface under a high pressure leads to suppression of transfer of a component in the magnetic layer that can contribute to running stability to the back coating layer side during storage under an environment of a high temperature. Such knowledge is not disclosed at all in JP2012-043495A. Then, as a result of further studies based on such knowledge, the present inventors newly found that it is possible to suppress a decrease in reproduction output during repeated reproduction under an environment of a low temperature and a high humidity after storage under an environment of a high temperature by setting the difference ($S_{0.5}-S_{13.5}$) measured on the back coating layer surface to 3 nm or less. It is considered that the small difference ($S_{0.5}-S_{13.5}$) of 3 nm or less indicates that a protrusion on the back coating layer surface hardly sinks into the back coating layer in a case where a high pressure is applied as described above.

However, the present invention is not limited to the above supposition. In addition, the present invention is not limited to another supposition of the present inventor described in this specification. For pressures of 13.5 atm and 0.5 atm during pressing in measurement of spacings for obtaining the above difference, in the present invention, 13.5 atm is adopted as an exemplary value that can correspond to a state where a high pressure is applied to the back coating layer surface as described above, and 0.5 atm is adopted as an exemplary value of a pressure that can be applied to the back coating layer surface in a case of contacting with the magnetic layer surface in another state. A pressure that can be applied to the magnetic recording medium during storage, reproduction, or the like of the magnetic recording medium is not limited to these pressures.

Hereinafter, the magnetic recording medium will be described more specifically.

Difference ($S_{0.5}-S_{13.5}$)

The difference ($S_{0.5}-S_{13.5}$) measured on the back coating layer surface of the magnetic recording medium is 3 nm or less, and is preferably 2 nm or less from a viewpoint of further suppressing a decrease in reproduction output during repeated reproduction under an environment of a low temperature and a high humidity after storage under an environment of a high temperature. In addition, the difference may be 0 nm or more, may be more than 0 nm, or may be 1 nm or more.

$S_{0.5}$ and $S_{13.5}$ are not particularly limited as long as the difference is 3 nm or less. $S_{0.5}$ and $S_{13.5}$ may be, for example, 20 nm or more, 22 nm or more, or 25 nm or more, respectively. In addition, $S_{0.5}$ and $S_{13.5}$ may be, for example, 90 nm or less, 85 nm or less, or 80 nm or less, respectively.

$S_{0.5}$ and $S_{13.5}$ can be controlled according to the type of non-magnetic powder (hereinafter, referred to as a "protrusion forming agent".) that can mainly contribute to forming of a protrusion on the back coating layer surface among types of non-magnetic powder included in the back coating layer, a manufacturing condition of the magnetic recording medium, and the like. Details of this point will be described later.

Next, the magnetic layer, the back coating layer, a non-magnetic support, and a non-magnetic layer optionally included in the magnetic recording medium will be further described.

Magnetic Layer

Ferromagnetic Powder

As the ferromagnetic powder included in the magnetic layer, well-known ferromagnetic powder as ferromagnetic powder used in magnetic layers of various magnetic recording media can be used alone or in combination of two or more. From a viewpoint of improving recording density, it is preferable to use ferromagnetic powder having a small average particle size. From this point, the average particle size of ferromagnetic powder is preferably 50 nm or less, more preferably 45 nm or less, still more preferably 40 nm or less, still more preferably 35 nm or less, still more preferably 30 nm or less, still more preferably 25 nm or less, and still more preferably 20 nm or less. On the other hand, from a viewpoint of magnetization stability, the average particle size of ferromagnetic powder is preferably 5 nm or more, more preferably 8 nm or more, still more preferably 10 nm or more, still more preferably 15 nm or more, and still more preferably 20 nm or more.

Hexagonal Ferrite Powder

Preferred specific examples of the ferromagnetic powder include hexagonal ferrite powder. For details of the hexagonal ferrite powder, for example, descriptions disclosed in paragraphs 0012 to 0030 of JP2011-225417A, paragraphs 0134 to 0136 of JP2011-216149A, paragraphs 0013 to 0030 of JP2012-204726A, and paragraphs 0029 to 0084 of JP2015-127985A can be referred to.

In the present invention and this specification, "hexagonal ferrite powder" refers to ferromagnetic powder in which a hexagonal ferrite type crystal structure is detected as a main phase by X-ray diffraction analysis. The main phase refers to a structure to which the highest intensity diffraction peak in an X-ray diffraction spectrum obtained by X-ray diffraction analysis is attributed. For example, in a case where the highest intensity diffraction peak is attributed to a hexagonal ferrite type crystal structure in an X-ray diffraction spectrum obtained by X-ray diffraction analysis, it is determined that the hexagonal ferrite type crystal structure is detected as the main phase. In a case where only a single structure is detected by X-ray diffraction analysis, this detected structure is taken as the main phase. The hexagonal ferrite type crystal structure includes at least an iron atom, a divalent metal atom and an oxygen atom, as a constituent atom. The divalent metal atom is a metal atom that can be a divalent cation as an ion, and examples thereof may include an alkaline earth metal atom such as a strontium atom, a barium atom, and a calcium atom, a lead atom, and the like. In the present invention and this specification, hexagonal strontium ferrite powder means that the main divalent metal atom included in this powder is a strontium atom, and hexagonal barium ferrite powder means that the main divalent metal atom included in this powder is a barium atom. The main divalent metal atom refers to a divalent metal atom that accounts for the most on an at % basis among divalent metal atoms included in the powder. Here, a rare earth atom is not included in the above divalent metal atom. The "rare earth atom" in the present invention and this specification is selected from the group consisting of a scandium atom (Sc), an yttrium atom (Y), and a lanthanoid atom. The Lanthanoid atom is selected from the group consisting of a lanthanum atom (La), a cerium atom (Ce), a praseodymium atom (Pr), a neodymium atom (Nd), a promethium atom (Pm), a samarium atom (Sm), a europium atom (Eu), a gadolinium atom (Gd), a terbium atom (Tb), a dysprosium atom (Dy), a holmium atom (Ho), an erbium atom (Er), a thulium atom (Tm), an ytterbium atom (Yb), and a lutetium atom (Lu).

Hereinafter, the hexagonal strontium ferrite powder, which is an aspect of the hexagonal ferrite powder, will be described in more detail.

An activation volume of hexagonal strontium ferrite powder is preferably in a range of 800 to 1600 nm$^3$. The finely granulated hexagonal strontium ferrite powder having an activation volume in the above range is suitable for manufacturing a magnetic recording medium exhibiting excellent electromagnetic conversion characteristics. The activation volume of the hexagonal strontium ferrite powder is preferably 800 nm$^3$ or more, for example, 850 nm$^3$ or more. Further, from a viewpoint of further improving the electromagnetic conversion characteristics, the activation volume of the hexagonal strontium ferrite powder is more preferably 1500 nm$^3$ or less, still more preferably 1400 nm$^3$ or less, still more preferably 1300 nm$^3$ or less, still more preferably 1200 nm$^3$ or less, and still more preferably 1100 nm$^3$ or less. The same applies to an activation volume of the hexagonal barium ferrite powder.

The "activation volume" is a unit of magnetization reversal and is an index indicating the magnetic size of a particle. An activation volume described in the present invention and this specification and an anisotropy constant Ku which will be described later are values obtained from the following relational expression between a coercivity Hc and an activation volume V, by performing measurement in an Hc measurement portion at a magnetic field sweep rate of 3 minutes and 30 minutes using a vibrating sample magnetometer (measurement temperature: 23° C.±1° C.). For a unit of the anisotropy constant Ku, 1 erg/cc=1.0×10$^{-1}$ J/m$^3$.

$$Hc=2Ku/Ms\{1-[(kT/KuV)\ln(At/0.693)]^{1/2}\}$$

[In the above formula, Ku: anisotropy constant (unit: J/m$^3$), Ms: saturation magnetization (Unit: kA/m), k: Boltzmann constant, T: absolute temperature (unit: K), V: activation volume (unit: cm$^3$), A: spin precession frequency (unit: s$^{-1}$), t: magnetic field reversal time (unit: s)]

An index for reducing thermal fluctuation, in other words, improving thermal stability may include an anisotropy constant Ku. The hexagonal strontium ferrite powder preferably has Ku of 1.8×10$^5$ J/m$^3$ or more, and more preferably has Ku of 2.0×10$^5$ J/m$^3$ or more. Ku of the hexagonal strontium ferrite powder may be, for example, 2.5×10$^5$ J/m$^3$ or less. Here, it means that the higher Ku is, the higher thermal stability is, this is preferable, and thus, a value thereof is not limited to the values exemplified above.

The hexagonal strontium ferrite powder may or may not include a rare earth atom. In a case where the hexagonal strontium ferrite powder includes a rare earth atom, it is preferable to include a rare earth atom at a content (bulk content) of 0.5 to 5.0 at % with respect to 100 at % of an iron atom. In an aspect, the hexagonal strontium ferrite powder including a rare earth atom may have a rare earth atom surface layer portion uneven distribution property. In the present invention and this specification, the "rare earth atom surface layer portion uneven distribution property" means that a rare earth atom content with respect to 100 at % of an iron atom in a solution obtained by partially dissolving hexagonal strontium ferrite powder with an acid (hereinafter, referred to as a "rare earth atom surface layer portion content" or simply a "surface layer portion content" for a rare earth atom.) and a rare earth atom content with respect to 100 at % of an iron atom in a solution obtained by totally dissolving hexagonal strontium ferrite powder with an acid (hereinafter, referred to as a "rare earth atom bulk content" or simply a "bulk content" for a rare earth atom.) satisfy a ratio of a rare earth atom surface layer portion content/a rare earth atom bulk content>1.0. A rare earth atom content in hexagonal strontium ferrite powder which will be described later is the same meaning as the rare earth atom bulk content. On the other hand, partial dissolution using an acid dissolves a surface layer portion of a particle configuring hexagonal strontium ferrite powder, and thus, a rare earth atom content in a solution obtained by partial dissolution is a rare earth atom content in a surface layer portion of a particle configuring hexagonal strontium ferrite powder. A rare earth atom surface layer portion content satisfying a ratio of "rare earth atom surface layer portion content/rare earth atom bulk content>1.0" means that in a particle of hexagonal strontium ferrite powder, rare earth atoms are unevenly distributed in a surface layer portion (that is, more than an inside). The surface layer portion in the present invention and this specification means a partial region from a surface of a particle configuring hexagonal strontium ferrite powder toward an inside.

In a case where hexagonal strontium ferrite powder includes a rare earth atom, a rare earth atom content (bulk content) is preferably in a range of 0.5 to 5.0 at % with respect to 100 at % of an iron atom. It is supposed that a bulk content in the above range of the included rare earth atom and uneven distribution of the rare earth atoms in a surface layer portion of a particle configuring hexagonal strontium ferrite powder contribute to an increase of the anisotropy constant Ku. The higher a value of an anisotropy constant Ku is, the more a phenomenon called so-called thermal fluctuation can be suppressed (in other words, thermal stability can be improved). It is supposed that uneven distribution of rare earth atoms in a particulate surface layer portion of hexagonal strontium ferrite powder contributes to stabilization of spins of iron (Fe) sites in a crystal lattice of a surface layer portion, and thus, an anisotropy constant Ku may be increased.

Moreover, it is supposed that the use of hexagonal strontium ferrite powder having a rare earth atom surface layer portion uneven distribution property as a ferromagnetic powder in the magnetic layer also contributes to inhibition of a magnetic layer surface from being scraped by being slid with respect to the magnetic head. That is, it is supposed that hexagonal strontium ferrite powder having rare earth atom surface layer portion uneven distribution property can also contribute to an improvement of running durability of the magnetic recording medium. It is supposed that this may be because uneven distribution of rare earth atoms on a surface of a particle configuring hexagonal strontium ferrite powder contributes to an improvement of interaction between the particle surface and an organic substance (for example, a binding agent and/or an additive) included in the magnetic layer, and, as a result, a strength of the magnetic layer is improved.

From a viewpoint of further improving the anisotropy constant Ku and/or a viewpoint of further improving the running durability, the rare earth atom content (bulk content) is more preferably in a range of 0.5 to 4.5 at %, still more preferably in a range of 1.0 to 4.5 at %, and still more preferably in a range of 1.5 to 4.5 at %.

The bulk content is a content obtained by totally dissolving hexagonal strontium ferrite powder. In the present invention and this specification, unless otherwise noted, the content of an atom means a bulk content obtained by totally dissolving hexagonal strontium ferrite powder. The hexagonal strontium ferrite powder including a rare earth atom may include only one kind of rare earth atom as the rare earth atom, or may include two or more kinds of rare earth atoms. The bulk content in the case of including two or more types of rare earth atoms is obtained for the total of two or more types of rare earth atoms. This also applies to other components in the present invention and this specification. That is, unless otherwise noted, a certain component may be used alone or in combination of two or more. A content amount or a content in a case where two or more components are used refers to that for the total of two or more components.

In a case where the hexagonal strontium ferrite powder includes a rare earth atom, the included rare earth atom may be any one or more of rare earth atoms. As a rare earth atom that is preferable from a viewpoint of further improving the anisotropy constant Ku, there are a neodymium atom, a samarium atom, a yttrium atom, and a dysprosium atom, here, the neodymium atom, the samarium atom, and the yttrium atom are more preferable, and a neodymium atom is still more preferable.

In the hexagonal strontium ferrite powder having a rare earth atom surface layer portion uneven distribution property, the rare earth atoms may be unevenly distributed in the surface layer portion of a particle configuring the hexagonal strontium ferrite powder, and the degree of uneven distribution is not limited. For example, for a hexagonal strontium ferrite powder having a rare earth atom surface layer portion uneven distribution property, a ratio between a surface layer portion content of a rare earth atom obtained by partial dissolution under dissolution conditions which will be described later and a bulk content of a rare earth atom obtained by total dissolution under dissolution conditions which will be described later, that is, "surface layer portion content/bulk content" exceeds 1.0 and may be 1.5 or more. "Surface layer portion content/bulk content" larger than 1.0 means that in a particle configuring the hexagonal strontium ferrite powder, rare earth atoms are unevenly distributed in the surface layer portion (that is, more than in the inside). Further, a ratio between a surface layer portion content of a rare earth atom obtained by partial dissolution under dissolution conditions which will be described later and a bulk content of a rare earth atom obtained by total dissolution under the dissolution conditions which will be described later, that is, "surface layer portion content/bulk content" may be, for example, 10.0 or less, 9.0 or less, 8.0 or less, 7.0 or less, 6.0 or less, 5.0 or less, or 4.0 or less. Here, in the hexagonal strontium ferrite powder having a rare earth atom surface layer portion uneven distribution property, the rare earth atoms may be unevenly distributed in the surface layer portion of a particle configuring the hexagonal strontium ferrite powder, and "surface layer portion content/bulk content" is not limited to the illustrated upper limit or lower limit.

The partial dissolution and the total dissolution of the hexagonal strontium ferrite powder will be described below. For the hexagonal strontium ferrite powder that exists as a powder, the partially and totally dissolved sample powder is taken from the same lot of powder. On the other hand, for the hexagonal strontium ferrite powder included in the magnetic layer of the magnetic recording medium, a part of the hexagonal strontium ferrite powder taken out from the magnetic layer is subjected to partial dissolution, and the other part is subjected to total dissolution. The hexagonal strontium ferrite powder can be taken out from the magnetic layer by a method described in a paragraph 0032 of JP2015-091747A, for example.

The partial dissolution means that dissolution is performed such that, at the end of dissolution, the residue of the hexagonal strontium ferrite powder can be visually checked in the solution. For example, by partial dissolution, it is possible to dissolve a region of 10 to 20 mass % of the particle configuring the hexagonal strontium ferrite powder with the total particle being 100 mass %. On the other hand, the total dissolution means that dissolution is performed such that, at the end of dissolution, the residue of the hexagonal strontium ferrite powder cannot be visually checked in the solution.

The partial dissolution and measurement of the surface layer portion content are performed by the following method, for example. Here, the following dissolution conditions such as an amount of sample powder are illustrative, and dissolution conditions for partial dissolution and total dissolution can be employed in any manner.

A container (for example, a beaker) containing 12 mg of sample powder and 10 mL of 1 mol/L hydrochloric acid is held on a hot plate at a set temperature of 70° C. for 1 hour. The obtained solution is filtered by a membrane filter of 0.1 µm. Elemental analysis of the filtrated solution is performed by an inductively coupled plasma (ICP) analyzer. In this way, the surface layer portion content of a rare earth atom with respect to 100 at % of an iron atom can be obtained. In a case where a plurality of types of rare earth atoms are detected by elemental analysis, the total content of all rare earth atoms is defined as the surface layer portion content. This also applies to the measurement of the bulk content.

On the other hand, the total dissolution and measurement of the bulk content are performed by the following method, for example.

A container (for example, a beaker) containing 12 mg of sample powder and 10 mL of 4 mol/L hydrochloric acid is held on a hot plate at a set temperature of 80° C. for 3 hours. Thereafter, the method is carried out in the same manner as the partial dissolution and the measurement of the surface layer portion content, and the bulk content with respect to 100 at % of an iron atom can be obtained.

From a viewpoint of increasing the reproduction output in a case of reproducing data recorded on the magnetic recording medium, it is desirable that mass magnetization σs of the ferromagnetic powder included in the magnetic recording medium is high. In this regard, the hexagonal strontium ferrite powder including a rare earth atom but not having the rare earth atom surface layer portion uneven distribution property tends to have σs largely lower than the hexagonal strontium ferrite powder including no rare earth atom. On the other hand, it is considered that hexagonal strontium ferrite powder having a rare earth atom surface layer portion uneven distribution property is preferable in suppressing such a large decrease in σs. In an aspect, σs of the hexagonal strontium ferrite powder may be 45 A·m$^2$/kg or more, and may be 47 A·m$^2$/kg or more. On the other hand, from a viewpoint of noise reduction, σs is preferably 80 A·m$^2$/kg or less and more preferably 60 A·m$^2$/kg or less. σs can be measured using a well-known measuring device, such as a vibrating sample magnetometer, capable of measuring magnetic properties. In the present invention and this specification, unless otherwise noted, the mass magnetization σs is a value measured at a magnetic field intensity of 15 kOe. 1 [kOe]=10$^6$/4π[A/m]

Regarding the content (bulk content) of a constituent atom of the hexagonal strontium ferrite powder, a strontium atom content may be, for example, in a range of 2.0 to 15.0 at % with respect to 100 at % of an iron atom. In an aspect, in the hexagonal strontium ferrite powder, a divalent metal atom included in the powder may be only a strontium atom. In another aspect, the hexagonal strontium ferrite powder may include one or more other divalent metal atoms in addition to a strontium atom. For example, a barium atom and/or a calcium atom may be included. In a case where another divalent metal atom other than a strontium atom is included, a barium atom content and a calcium atom content in the hexagonal strontium ferrite powder are, for example, in a range of 0.05 to 5.0 at % with respect to 100 at % of an iron atom, respectively.

As a crystal structure of hexagonal ferrite, a magnetoplumbite type (also referred to as an "M type".), a W type, a Y type, and a Z type are known. The hexagonal strontium ferrite powder may have any crystal structure. The crystal structure can be checked by X-ray diffraction analysis. In the hexagonal strontium ferrite powder, a single crystal structure or two or more crystal structures may be detected by X-ray diffraction analysis. For example, according to an aspect, in the hexagonal strontium ferrite powder, only the M-type crystal structure may be detected by X-ray diffraction analysis. For example, M-type hexagonal ferrite is represented by a composition formula of $AFe_{12}O_{19}$. Here, A represents a divalent metal atom, and in a case where the hexagonal strontium ferrite powder is the M-type, A is only a strontium atom (Sr), or in a case where, as A, a plurality of divalent metal atoms are included, as described above, a strontium atom (Sr) accounts for the most on an at % basis. The divalent metal atom content of the hexagonal strontium ferrite powder is usually determined by the type of crystal structure of the hexagonal ferrite and is not particularly limited. The same applies to the iron atom content and the oxygen atom content. The hexagonal strontium ferrite powder may include at least an iron atom, a strontium atom, and an oxygen atom, and may further include a rare earth atom. Furthermore, the hexagonal strontium ferrite powder may or may not include atoms other than these atoms. As an example, the hexagonal strontium ferrite powder may include an aluminum atom (Al). A content of an aluminum atom can be, for example, 0.5 to 10.0 at % with respect to 100 at % of an iron atom. From a viewpoint of further improving the anisotropy constant Ku, the hexagonal strontium ferrite powder includes an iron atom, a strontium atom, an oxygen atom, and a rare earth atom, and the content of atoms other than these atoms is preferably 10.0 at % or less, more preferably in a range of 0 to 5.0 at %, and may be 0 at % with respect to 100 at % of an iron atom. That is, in an aspect, the hexagonal strontium ferrite powder may not include atoms other than an iron atom, a strontium atom, an oxygen atom, and a rare earth atom. The content expressed in at % is obtained by converting a content of each atom (unit: mass %) obtained by totally dissolving hexagonal strontium ferrite powder into a value expressed in at % using an atomic weight of each atom. Further, in the present invention and this specification, "not include" for a certain atom means that a content measured by an ICP analyzer after total dissolution is 0 mass %. A detection limit of the ICP analyzer is usually 0.01 parts per million (ppm) or less on a mass basis. The "not included" is used as a meaning including that an atom is included in an amount less than the detection limit of the ICP analyzer. In an aspect, the hexagonal strontium ferrite powder may not include a bismuth atom (Bi).

Metal Powder

Preferable specific examples of the ferromagnetic powder include ferromagnetic metal powder. For details of the ferromagnetic metal powder, for example, descriptions disclosed in paragraphs 0137 to 0141 of JP2011-216149A and paragraphs 0009 to 0023 of JP2005-251351A can be referred to.

ε-Iron Oxide Powder

Preferable specific examples of the ferromagnetic powder include ε-iron oxide powder. In the present invention and this specification, "ε-iron oxide powder" refers to ferromagnetic powder in which a ε-iron oxide type crystal structure is detected as a main phase by X-ray diffraction analysis. For example, in a case where the highest intensity diffraction peak is attributed to a ε-iron oxide type crystal structure in an X-ray diffraction spectrum obtained by X-ray diffraction analysis, it is determined that the ε-iron oxide type crystal structure is detected as the main phase. As a manufacturing method of the ε-iron oxide powder, a manufacturing method from a goethite, a reverse micelle method, and the like are known. All of the manufacturing methods are well known. Regarding a method of manufacturing ε-iron oxide powder in which a part of Fe is substituted with substitutional atoms such as Ga, Co, Ti, Al, or Rh, a description disclosed in J. Jpn. Soc. Powder Metallurgy Vol. 61 Supplement, No. S1, pp. S280 to S284, J. Mater. Chem. C, 2013, 1, pp. 5200 to 5206 can be referred to, for example. Here, the manufacturing method of ε-iron oxide powder capable of being used as the ferromagnetic powder in the magnetic layer of the magnetic recording medium is not limited to the methods described here.

An activation volume of the ε-iron oxide powder is preferably in a range of 300 to 1500 $nm^3$. The finely granulated ε-iron oxide powder having an activation volume in the above range is suitable for manufacturing a magnetic recording medium exhibiting excellent electromagnetic conversion characteristics. The activation volume of the ε-iron oxide powder is preferably 300 $nm^3$ or more, for example, 500 $nm^3$ or more. Further, from a viewpoint of further improving the electromagnetic conversion characteristics, the activation volume of the ε-iron oxide powder is more preferably 1400 $nm^3$ or less, still more preferably 1300 $nm^3$ or less, still more preferably 1200 $nm^3$ or less, and still more preferably 1100 $nm^3$ or less.

An index for reducing thermal fluctuation, in other words, improving thermal stability may include an anisotropy constant Ku. The ε-iron oxide powder preferably has Ku of $3.0 \times 10^4$ $J/m^3$ or more, and more preferably has Ku of $8.0 \times 10^4$ $J/m^3$ or more. Ku of the ε-iron oxide powder may be, for example, $3.0 \times 10^5$ $J/m^3$ or less. Here, it means that the higher Ku is, the higher thermal stability is, this is preferable, and thus, a value thereof is not limited to the values exemplified above.

From a viewpoint of increasing the reproduction output in a case of reproducing data recorded on the magnetic recording medium, it is desirable that mass magnetization σs of the ferromagnetic powder included in the magnetic recording medium is high. In this regard, in an aspect, σs of the ε-iron oxide powder may be 8 $A \cdot m^2/kg$ or more, and may be 12 $A \cdot m^2/kg$ or more. On the other hand, from a viewpoint of noise reduction, σs of the ε-iron oxide powder is preferably 40 $A \cdot m^2/kg$ or less and more preferably 35 $A \cdot m^2/kg$ or less.

In the present invention and this specification, unless otherwise noted, an average particle size of various types of powder such as ferromagnetic powder is a value measured by the following method using a transmission electron microscope.

The powder is imaged at a magnification ratio of 100,000 using a transmission electron microscope, and the image is printed on printing paper so that the total magnification ratio is 500,000 to obtain an image of particles configuring the powder. A target particle is selected from the obtained image of particles, an outline of the particle is traced with a digitizer, and a size of the particle (primary particle) is measured. The primary particle is an independent particle which is not aggregated.

The measurement described above is performed regarding 500 particles randomly extracted. An arithmetic average of the particle sizes of 500 particles obtained as described above is an average particle size of the powder. As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss. An average particle size shown in Examples which will be described later is a value measured by using a transmission electron microscope H-9000 manufactured by Hitachi, Ltd. as the transmission electron microscope, and image analysis software KS-400 manufactured by Carl Zeiss as the image analysis software, unless otherwise noted. In the present invention and this specification, the powder means an aggregate of a plurality of particles. For example, ferromagnetic powder means an aggregate of a plurality of ferromagnetic particles. Further, the aggregate of the plurality of particles not only includes an aspect in which particles configuring the aggregate directly come into contact with each other, but also includes an aspect in which a binding agent or an additive which will be described later is interposed between the particles. The term "particle" is used to describe powder in some cases.

As a method of taking sample powder from the magnetic recording medium in order to measure the particle size, a method disclosed in a paragraph of 0015 of JP2011-048878A can be used, for example.

In the present invention and this specification, unless otherwise noted, (1) in a case where the shape of the particle observed in the particle image described above is a needle shape, a fusiform shape, or a columnar shape (here, a height is greater than a maximum long diameter of a bottom surface), the size (particle size) of the particles configuring the powder is shown as a length of a long axis configuring the particle, that is, a long axis length, (2) in a case where the shape of the particle is a plate shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an amorphous shape, and the long axis configuring the particles cannot be specified from the shape, the particle size is shown as an equivalent circle diameter. The equivalent circle diameter is a value obtained by a circle projection method.

In addition, regarding an average acicular ratio of the powder, a length of a short axis, that is, a short axis length of the particles is measured in the measurement described above, a value of (long axis length/short axis length) of each particle is obtained, and an arithmetic average of the values obtained regarding 500 particles is calculated. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience.

In addition, unless otherwise noted, in a case where the shape of the particle is specified, for example, in a case of definition of the particle size (1), the average particle size is an average long axis length, and in a case of the definition (2), the average particle size is an average plate diameter. In a case of the definition (3), the average particle size is an average diameter (also referred to as an average particle diameter).

A content (filling percentage) of the ferromagnetic powder of the magnetic layer is preferably in a range of 50 to 90 mass % and more preferably in a range of 60 to 90 mass %. A high filling percentage of the ferromagnetic powder in the magnetic layer is preferable from a viewpoint of improving recording density.

Binding Agent

The above-described magnetic recording medium may be a coating type magnetic recording medium, and may include a binding agent in the magnetic layer. The binding agent is one or more resins. As the binding agent, various resins usually used as a binding agent pf a coating type magnetic recording medium can be used. For example, as the binding agent, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. The resin may be a homopolymer or a copolymer. These resins can be used as the binding agent even in the back coating layer and/or a non-magnetic layer which will be described later.

For the binding agent described above, descriptions disclosed in paragraphs 0028 to 0031 of JP2010-024113A can be referred to. An average molecular weight of the resin used as the binding agent can be, for example, 10,000 or more and 200,000 or less as a weight-average molecular weight. The weight-average molecular weight of the present invention and this specification is a value obtained by performing polystyrene conversion of a value measured by gel permeation chromatography (GPC) under the following measurement conditions. A weight-average molecular weight of a binding agent shown in Examples which will be described later is a value obtained by performing polystyrene conversion of a value measured under the following measurement conditions. The binding agent can be used in an amount of, for example, 1.0 to 30.0 parts by mass with respect to 100.0 parts by mass of the ferromagnetic powder.

GPC device: HLC-8120 (manufactured by Tosoh Corporation)

Column: TSK gel Multipore HXL-M (manufactured by Tosoh Corporation, 7.8 mm inner diameter (ID)×30.0 cm)

Eluent: Tetrahydrofuran (THF)

In addition, a curing agent can also be used together with the resin which can be used as the binding agent. As the curing agent, in an aspect, a thermosetting compound which is a compound in which curing reaction (crosslinking reaction) proceeds due to heating can be used, and in another aspect, a photocurable compound in which a curing reaction (crosslinking reaction) proceeds due to light irradiation can be used. Curing reaction proceeds during a process of forming a magnetic layer, whereby at least a part of the curing agent can be included in the magnetic layer in a state of being reacted (crosslinked) with other components such as the binding agent. The same applies to the layer formed using this composition in a case where the composition used to form the other layer includes a curing agent. The preferred curing agent is a thermosetting compound, and polyisocyanate is suitable for this. For details of the polyisocyanate, descriptions disclosed in paragraphs 0124 and 0125 of JP2011-216149A can be referred to. The curing agent can be used in a magnetic layer forming composition in an amount of, for example, 0 to 80.0 parts by mass, and preferably 50.0 to 80.0 parts by mass, from a viewpoint of improving a strength of the magnetic layer, with respect to 100.0 parts by mass of the binding agent.

The above description regarding the binding agent and the curing agent can be applied to the back coating layer and/or the non-magnetic layer. In this case, the above description regarding the content can be applied by replacing the ferromagnetic powder with the non-magnetic powder.

Additive

The magnetic layer may include one or more kinds of additives, as necessary. As the additives, the curing agent described above is used as an example. In addition, examples of the additive which can be included in the magnetic layer include non-magnetic powder, a lubricant, a dispersing agent, a dispersing assistant, an antibacterial agent, an antistatic agent, and an antioxidant. As the non-magnetic powder, non-magnetic powder which can function as an abrasive, or non-magnetic powder which can function as a protrusion forming agent which forms protrusions suitably protruded from the magnetic layer surface (for example, non-magnetic colloidal particles) is used. An average particle size of colloidal silica (silica colloidal particle) shown in Examples which will be described later is a value obtained by a method disclosed in a paragraph 0015 of JP2011-048878A as a method for measuring an average particle size. As an example of the additive that can be used in the magnetic layer containing the abrasive, a dispersing agent disclosed in paragraphs 0012 to 0022 of JP2013-131285A can be used as a dispersing agent for improving dispersibility of the abrasive. For the dispersing agent, descriptions disclosed in paragraphs 0061 and 0071 of JP2012-133837A can be referred to. For the dispersing agent, descriptions disclosed in paragraphs 0061 and 0071 of JP2012-133837A and a paragraph 0035 of JP2017-016721A can be referred to. For the additive of the magnetic layer, descriptions disclosed in paragraphs 0035 to 0077 of JP2016-051493A can be referred to.

The dispersing agent may be included in the non-magnetic layer. For the dispersing agent which may be included in the non-magnetic layer, a description disclosed in a paragraph 0061 of JP2012-133837A can be referred to.

As various additives, a commercially available product can be suitably selected or manufactured by a well-known method according to the desired properties, and any amount thereof can be used.

In an aspect, the magnetic recording medium may include a lubricant in a portion on the magnetic layer side on a non-magnetic support. The portion on the magnetic layer side on the non-magnetic support is the magnetic layer in the magnetic recording medium having the magnetic layer directly on the non-magnetic support, and is the non-magnetic layer and/or the magnetic layer in the magnetic recording medium having the non-magnetic layer and the magnetic layer in this order on the non-magnetic support. The lubricant is an example of a component that can contribute to running stability described above. It is considered that in a case where it is possible to reduce the amount of the lubricant included in the portion on the magnetic layer side on the non-magnetic support during storage under an environment of a high temperature that is transferred from the magnetic layer surface to the back coating layer side, a decrease of reproduction output during repeated reproduction under an environment of a low temperature and a high humidity can be suppressed. It is supposed that the difference of 3 nm or less can contribute to this.

The lubricant may include one or more lubricants selected from the group consisting of a fatty acid, a fatty acid ester, and a fatty acid amide.

Examples of the fatty acid include lauric acid, myristic acid, palmitic acid, stearic acid, oleic acid, linoleic acid, linolenic acid, behenic acid, erucic acid, and elaidic acid, and stearic acid, myristic acid, and palmitic acid are preferred, and stearic acid is more preferred. The fatty acid may be contained in the magnetic layer in a form of a salt such as a metal salt.

Examples of the fatty acid ester include esters of lauric acid, myristic acid, palmitic acid, stearic acid, oleic acid, linoleic acid, linolenic acid, behenic acid, erucic acid, and elaidic acid. Specific examples thereof include, for example, butyl myristate, butyl palmitate, butyl stearate, neopentyl glycol dioleate, sorbitan monostearate, sorbitan distearate, sorbitan tristearate, oleyl oleate, isocetyl stearate, isotridecyl stearate, octyl stearate, isooctyl stearate, amyl stearate, and butoxyethyl stearate.

Examples of the fatty acid amide include amides of various fatty acids described above, for example, lauric acid amide, myristic acid amide, palmitic acid amide, stearic acid amide, and the like.

For the fatty acid and a derivative of the fatty acid (such as amide and ester), a fatty acid-derived moiety of the fatty acid derivative preferably has a structure which is the same as or similar to that of the fatty acid used in combination. For example, it is preferable to use stearic acid ester and/or stearic acid amide in a case where stearic acid is used as the fatty acid.

A content of a fatty acid of the magnetic layer (or a magnetic layer forming composition; the same applies hereinafter) is, for example, 0 to 10.0 parts by mass, preferably 0.1 to 10.0 parts by mass, and more preferably 1.0 to 7.0 parts by mass per 100.0 parts by mass of the ferromagnetic powder. A content of a fatty acid ester of the magnetic layer is, for example, 0 to 10.0 parts by mass, preferably 0.1 to 10.0 parts by mass, and more preferably 1.0 to 7.0 parts by mass per 100.0 parts by mass of the ferromagnetic powder. A content of a fatty acid amide of the magnetic layer is, for example, 0 to 3.0 parts by mass, preferably 0 to 2.0 parts by mass, and more preferably 0 to 1.0 part by mass per 100.0 parts by mass of the ferromagnetic powder.

In a case where the magnetic recording medium has a non-magnetic layer between the non-magnetic support and the magnetic layer, a content of a fatty acid in a non-magnetic layer (or a non-magnetic layer forming composition; the same applies hereinafter) is, for example, 0 to 10.0 parts by mass, preferably 1.0 to 10.0 parts by mass, and more preferably 1.0 to 7.0 parts by mass per 100.0 parts by mass of the non-magnetic powder. A content of a fatty acid ester in the non-magnetic layer is, for example, 0 to 15.0 parts by mass, and preferably 0.1 to 10.0 parts by mass per 100.0 parts by mass of the non-magnetic powder. A content of a fatty acid amide in the non-magnetic layer is, for example, 0 to 3.0 parts by mass, and preferably 0 to 1.0 part by mass per 100.0 parts by mass of the non-magnetic powder. A lubricant included in the non-magnetic layer can be transferred to the magnetic layer, or can be transferred thereto for contributing to running stability.

The magnetic layer described above can be provided directly on a surface of the non-magnetic support or indirectly through the non-magnetic layer.

Non-Magnetic Layer

Next, the non-magnetic layer will be described. The above magnetic recording medium may have a magnetic layer directly on the non-magnetic support, or may have a non-magnetic layer including non-magnetic powder and a binding agent between the non-magnetic support and the magnetic layer. Non-magnetic powder used for the non-magnetic layer may be inorganic powder or organic powder. In addition, carbon black and the like can be used. Examples of the inorganic powder include types of powder of metal, metal oxide, metal carbonate, metal sulfate, metal nitride, metal carbide, and metal sulfide. These types of non-magnetic powder can be purchased as a commercially available product or can be manufactured by a well-known method. For details thereof, descriptions disclosed in paragraphs 0146 to 0150 of JP2011-216149A can be referred to. For carbon black which can be used in the non-magnetic layer, descriptions disclosed in paragraphs 0040 and 0041 of JP2010-024113A can be referred to. A content (filling percentage) of the non-magnetic powder of the non-magnetic layer is preferably in a range of 50 to 90 mass % and more preferably in a range of 60 to 90 mass %.

The non-magnetic layer can include a binding agent, and can also include an additive. For other details of a binding agent or an additive of the non-magnetic layer, a well-known technology regarding the non-magnetic layer can be applied. In addition, in regards to the type and the content of the binding agent, and the type and the content of the additive, for example, a well-known technology regarding the magnetic layer can be applied.

In the present invention and this specification, the non-magnetic layer also includes a substantially non-magnetic layer including a small amount of ferromagnetic powder as impurities, for example, or intentionally, together with the non-magnetic powder. Here, the substantially non-magnetic layer is a layer having a residual magnetic flux density equal to or smaller than 10 mT, a layer having a coercivity equal to or smaller than 100 Oe, or a layer having a residual magnetic flux density equal to or smaller than 10 mT and a coercivity equal to or smaller than 100 Oe. It is preferable that the non-magnetic layer does not have a residual magnetic flux density and a coercivity.

Non-Magnetic Support

Next, the non-magnetic support will be described. As the non-magnetic support (hereinafter, also simply referred to as a "support"), well-known components such as polyethylene terephthalate, polyethylene naphthalate, polyamide, polyamide imide, and aromatic polyamide subjected to biaxial stretching are used. Among these, polyethylene terephthalate, polyethylene naphthalate, and polyamide are preferable. A corona discharge, a plasma treatment, an easy-bonding treatment, or a heat treatment may be performed with respect to these supports in advance.

Back Coating Layer

The above magnetic recording medium includes a back coating layer including non-magnetic powder on a surface side of a non-magnetic support opposite to a surface side provided with a magnetic layer. The non-magnetic powder included in the back coating layer can preferably be a protrusion forming agent and one or more other types of non-magnetic powder.

Protrusion Forming Agent

As the protrusion forming agent, a particle of an inorganic substance can be used, a particle of an organic substance can be used, and a composite particle of an inorganic substance and an organic substance can also be used. Examples of the inorganic substance include an inorganic oxide such as metal oxide, metal carbonate, metal sulfate, metal nitride, metal carbide, and metal sulfide, and an inorganic oxide is preferable. In an aspect, the protrusion forming agent may be an inorganic oxide-based particle. Here, the "-based" is used to mean "including". An aspect of the inorganic oxide-based particle is a particle made of an inorganic oxide. Another aspect of the inorganic oxide-based particle is a composite particle of an inorganic oxide and an organic substance, and specific examples thereof include a composite particle of an inorganic oxide and a polymer. Examples of such particle include a particle having a polymer bonded to a surface of an inorganic oxide particle.

The above $S_{0.5}$ can be controlled mainly by a particle size of the protrusion forming agent. An average particle size of the protrusion forming agent is, for example, 30 to 300 nm, and preferably 40 to 200 nm. $S_{13.5}$ can be controlled by a shape of the protrusion forming agent in addition to the particle size of the protrusion forming agent. The closer the particle shape is to a true sphere, the smaller the pushing resistance working in a case where a high pressure is applied, so that the particle is likely to be pushed into the back coating layer, and $S_{13.5}$ is likely to be small. On the other hand, in a case where the particle shape is a shape away from the true sphere, for example, a so-called deformed shape, a large pushing resistance is likely to work in a case where a high pressure is applied, so that the particle is hardly pushed into the back coating layer, and $S_{13.5}$ is likely to be large. In addition, even a particle having a non-uniform surface and a low surface smoothness is likely to have a large pushing resistance in a case where a high pressure is applied, so that the particle is hardly pushed into the back coating layer, and $S_{13.5}$ is likely to be large. By controlling $S_{0.5}$ and $S_{13.5}$, the difference ($S_{0.5}-S_{13.5}$) can be set to 3 nm or less.

From a viewpoint that the protrusion forming agent can exhibit its function more satisfactorily, a content of the protrusion forming agent in the back coating layer is preferably 1.0 to 4.0 parts by mass, and more preferably 1.2 to 3.5 parts by mass with respect to 100.0 parts by mass of the other non-magnetic powder. In an aspect, a content of the composite particle of the inorganic oxide and the polymer in the back coating layer is preferably 1.0 to 4.0 parts by mass, and more preferably 1.2 to 3.5 parts by mass with respect to 100.0 parts by mass of the other non-magnetic powder.

Other Non-Magnetic Powder

For the other non-magnetic powder included in the back coating layer, the above description regarding the non-magnetic powder in the non-magnetic layer can be referred to. As the other non-magnetic powder, preferably, either one or both of carbon black and non-magnetic powder other than carbon black can be used. Examples of the non-magnetic powder other than carbon black include non-magnetic inorganic powder. Specific examples of the non-magnetic inorganic powder include non-magnetic inorganic powder of iron oxide such as α-iron oxide, titanium oxide such as titanium dioxide, cerium oxide, tin oxide, tungsten oxide, ZnO, $ZrO_2$, $SiO_2$, $Cr_2O_3$, α-alumina, β-alumina, γ-alumina, goethite, corundum, silicon nitride, titanium carbide, magnesium oxide, boron nitride, molybdenum disulfide, copper oxide, $MgCO_3$, $CaCO_3$, $BaCO_3$, $SrCO_3$, $BaSO_4$, silicon carbide, and titanium carbide. The preferable non-magnetic inorganic powder is non-magnetic inorganic oxide powder, more preferably α-iron oxide and titanium oxide, and still more preferably α-iron oxide.

A shape of the non-magnetic powder other than carbon black may be any of a needle shape, a sphere shape, a polyhedron shape, and a plate shape. An average particle size of the non-magnetic powder is preferably in a range of 5 nm to 2.00 µm, and more preferably in a range of 10 nm to 200 nm. In addition, a BET specific surface area of the non-magnetic powder other than carbon black is preferably in a range of 1 to 100 m$^2$/g, more preferably in a range of 5 to 70 m$^2$/g, and still more preferably in a range of 10 to 65 m$^2$/g. On the other hand, an average particle size of carbon black is, for example, in a range of 5 to 80 nm, preferably in a range of 10 to 50 nm, and more preferably in a range of 10 to 40 nm. A content of carbon black with respect to a total amount of the other non-magnetic powder of 100.0 parts by mass can be set in a range of, for example, 10.0 to 100.0 parts by mass. The total amount of the other non-magnetic powder may be the amount of carbon black. Alternatively, the total amount of the other non-magnetic powder may be the content of the non-magnetic powder other than carbon black. Values of $S_{0.5}$ and $S_{13.5}$ tend to increase as a proportion of carbon black in the other non-magnetic powder increases. For a content (filling percentage) of the other non-magnetic powder in the back coating layer, the above description regarding the non-magnetic powder in the non-magnetic layer can be referred to.

The back coating layer can include a binding agent, and can also include an additive. In regards to the binding agent and the additive of the back coating layer, the well-known technology regarding the back coating layer can be applied, and the well-known technology regarding the treatment of the magnetic layer and/or the non-magnetic layer can be applied. For example, for the back coating layer, descriptions disclosed in paragraphs 0018 to 0020 of JP2006-331625A and page 4, line 65 to page 5, line 38 of U.S. Pat. No. 7,029,774B can be referred to.

As an example of the additive which can be included in the back coating layer, a lubricant is used. For the lubricant, the above description regarding the lubricant that can be included in the magnetic layer or the like can be referred to. A content of a fatty acid of the back coating layer (or a back coating layer forming composition; the same applies hereinafter) is, for example, 0 to 10.0 parts by mass, preferably 0.1 to 10.0 parts by mass, and more preferably 1.0 to 7.0 parts by mass per 100.0 parts by mass of the non-magnetic powder included in the back coating layer. A content of a fatty acid ester of the back coating layer forming composition is, for example, 0.1 to 10.0 parts by mass and preferably 1.0 to 5.0 parts by mass per 100.0 parts by mass of the non-magnetic powder included in the back coating layer. A content of a fatty acid amide of the back coating layer is, for example, 0 to 3.0 parts by mass, preferably 0 to 2.0 parts by mass, and more preferably 0 to 1.0 parts by mass per 100.0 parts by mass of the non-magnetic powder included in the back coating layer.

The above $S_{0.5}$ and $S_{13.5}$ are values measured after n-hexane cleaning. In a case where a liquid film of a lubricant exists on the surface of the back coating layer that is pressed during measurement of a spacing, the measured spacing becomes narrow by a thickness of the liquid film. With respect to this, it is supposed that a lubricant that can exist as a liquid film during pressing can be removed by n-hexane cleaning. Therefore, it is considered that by measuring a spacing after n-hexane cleaning, the measured value of the spacing can be obtained as a value satisfactorily corresponding to a height of a protrusion on the back coating layer surface in a pressed state.

Various Thicknesses

For thicknesses of the non-magnetic support and each layer in the magnetic recording medium, a thickness of the non-magnetic support is, for example, 3.0 to 80.0 µm, preferably in a range of 3.0 to 50.0 µm, and more preferably in a range of 3.0 to 10.0 µm.

A thickness of the magnetic layer can be optimized according to a saturation magnetization amount or a head gap length, and a band of a recording signal of the used magnetic head, and is, for example, 10 nm to 100 nm, and, from a viewpoint of high density recording, is preferably in a range of 20 to 90 nm and more preferably in a range of 30 to 70 nm. The magnetic layer may be at least a single layer, the magnetic layer may be separated into two or more layers having different magnetic properties, and a configuration of a well-known multilayered magnetic layer can be applied as the magnetic layer. A thickness of the magnetic layer in a case where the magnetic layer is separated into two or more layers is a total thickness of the layers.

A thickness of the non-magnetic layer is, for example, 50 nm or more, preferably 70 nm or more, and more preferably 100 nm or more. In addition, the thickness of the non-magnetic layer is preferably 800 nm or less, and more preferably 500 nm or less.

A thickness of the back coating layer may be, for example, 0.1 µm or more. The thickness of the back coating layer is preferably 0.9 µm or less, more preferably 0.7 µm or less, and still more preferably 0.5 µm or less.

Thicknesses of each layer and the non-magnetic support of the magnetic recording medium can be obtained by a well-known film thickness measurement method. As an example, a cross section of the magnetic recording medium in a thickness direction is exposed by well-known means such as an ion beam or a microtome, and then the exposed cross section observation is performed using a scanning electron microscope, for example. In the cross section observation, various thicknesses can be obtained as a thickness obtained at any one portion of the cross section, or an arithmetic average of thicknesses obtained at a plurality of portions of two or more portions, for example, two portions which are randomly extracted. In addition, the thickness of each layer may be obtained as a designed thickness calculated according to manufacturing conditions.

Manufacturing Method

A composition for forming the magnetic layer, the non-magnetic layer, or the back coating layer usually includes a solvent together with the various components described above. As a solvent, various organic solvents generally used for manufacturing a coating type magnetic recording medium can be used. Among these, from a viewpoint of solubility of the binding agent usually used in the coating type magnetic recording medium, each layer forming composition preferably includes one or more ketone solvents such as acetone, methyl ethyl ketone, methyl isobutyl ketone, diisobutyl ketone, cyclohexanone, isophorone, and tetrahydrofuran. The amount of the solvent in each layer forming composition is not particularly limited, and can be set to the same as that of each layer forming composition of a typical coating type magnetic recording medium. In addition, a process of preparing each layer forming composition can generally include at least a kneading process, a dispersing process, and a mixing process provided before and after these processes as necessary. Each process may be divided into two or more stages. Components used for the preparation of each layer forming composition may be added at an initial stage or in a middle stage of each process. In addition, each component may be separately added in two or more processes. For example, a binding agent may be added separately in a kneading process, a dispersing process, and a mixing process for adjusting a viscosity after dispersion. In a process of manufacturing the magnetic recording medium, a well-known manufacturing technology in a related art can be used in a part or all of the processes. In the kneading process, an open kneader, a continuous kneader, a pressure kneader, or a kneader having a strong kneading force such as an extruder is preferably used. Details of the kneading treatment are described in JP1989-106338A (JP-H01-106338A) and JP1989-079274A (JP-H01-079274A). In addition, in order to disperse each layer forming composition, glass beads and/or other beads can be used. As such dispersed beads, zirconia beads, titania beads, and steel beads which are dispersed beads having a high specific gravity are suitable. These dispersed beads are preferably used by optimizing a particle diameter (bead diameter) and filling percentage. As a dispersing device, a well-known dispersing device can be used. Each layer forming composition may be filtered by a well-known method before being subjected to a coating process. The filtering can be performed by using a filter, for example. As the filter used for the filtering, a filter having a pore diameter of 0.01 to 3 μm (for example, filter made of glass fiber or filter made of polypropylene) can be used, for example.

In an aspect, in a process of preparing the back coating layer forming composition, after a dispersion liquid including a protrusion forming agent (hereinafter, referred to as a "protrusion forming agent liquid".) is prepared, the protrusion forming agent liquid can be mixed with one or more other components of the back coating layer forming composition. For example, the protrusion forming agent liquid can be prepared by a well-known dispersion treatment such as an ultrasonic treatment. The ultrasonic treatment can be performed for about 1 to 300 minutes at an ultrasonic output of about 10 to 2000 watts per 200 cc (1 cc=1 cm$^3$), for example. Moreover, the filtering may be performed after the dispersion treatment. For the filter used for the filtering, the above description can be referred to.

The magnetic layer can be formed, for example, by directly applying the magnetic layer forming composition onto the non-magnetic support or performing multilayer applying of the magnetic layer forming composition with the non-magnetic layer forming composition in order or at the same time. In a form of performing an orientation treatment, the orientation treatment is performed on a coating layer of the magnetic layer forming composition in an orientation zone while the coating layer is in a wet state. For the orientation treatment, the various well-known technologies including a description disclosed in a paragraph 0052 of JP2010-024113A can be used. For example, a vertical orientation treatment can be performed by a well-known method such as a method using a polar opposing magnet. In the orientation zone, a drying speed of the coating layer can be controlled depending on a temperature and a flow rate of dry air and/or a transportation speed in the orientation zone. The coating layer may be preliminarily dried before the transportation to the orientation zone.

The back coating layer can be formed by applying the back coating layer forming composition onto a side of the non-magnetic support opposite to a side provided with the magnetic layer (or to be provided with the magnetic layer). For details of coating for forming each layer, a description disclosed in a paragraph 0066 of JP2010-231843A can be referred to.

For other various processes for manufacturing the magnetic recording medium, descriptions disclosed in paragraphs 0067 to 0070 of JP 2010-231843A can be referred to.

It is possible to form a servo pattern in the magnetic recording medium manufactured as described above by a well-known method in order to enable tracking control of the magnetic head in the magnetic recording and reproducing apparatus, control of a running speed of the magnetic recording medium, and the like. The "formation of the servo pattern" can also be referred to as "recording of a servo signal". The magnetic recording medium may be a tape-shaped magnetic recording medium (magnetic tape) in as aspect, and may be a disk-shaped magnetic recording medium (magnetic disk) in another aspect. Hereinafter, the formation of the servo patterns will be described using a magnetic tape as an example.

The servo pattern is usually formed along a longitudinal direction of the magnetic tape. Examples of control (servo control) types using a servo signal include a timing-based servo (TBS), an amplitude servo, and a frequency servo.

As shown in a European computer manufacturers association (ECMA)-319, a magnetic tape conforming to a linear tape-open (LTO) standard (generally referred to as an "LTO tape".) employs a timing-based servo system. In the timing-based servo system, the servo pattern is formed by continuously disposing a plurality of pairs of non-parallel magnetic stripes (also referred to as "servo stripes".) in a longitudinal direction of the magnetic tape. As described above, the reason why the servo pattern is formed of a pair of non-parallel magnetic stripes is to indicate, to a servo signal reading element passing over the servo pattern, a passing position thereof. Specifically, the pair of magnetic stripes is formed so that an interval thereof continuously changes along a width direction of the magnetic tape, and the servo signal reading element reads the interval to thereby sense a relative position between the servo pattern and the servo signal reading element. Information on this relative position enables tracking on a data track. Therefore, a plurality of servo tracks are usually set on the servo pattern along a width direction of the magnetic tape.

A servo band is formed of servo signals continuous in a longitudinal direction of the magnetic tape. A plurality of the servo bands are usually provided on the magnetic tape. For example, in an LTO tape, the number is five. A region interposed between two adjacent servo bands is referred to as a data band. The data band is formed of a plurality of data tracks, and each data track corresponds to each servo track.

Further, in an aspect, as shown in JP2004-318983A, information indicating a servo band number (referred to as "servo band identification (ID)" or "unique data band identification method (UDIM) information".) is embedded in each servo band. This servo band ID is recorded by shifting a specific one of the plurality of pairs of the servo stripes in the servo band so that positions thereof are relatively displaced in a longitudinal direction of the magnetic tape. Specifically, a way of shifting the specific one of the plurality of pairs of servo stripes is changed for each servo band. Accordingly, the recorded servo band ID is unique for each servo band, and thus, the servo band can be uniquely specified only by reading one servo band with a servo signal reading element.

Incidentally, as a method for uniquely specifying the servo band, there is a method using a staggered method as shown in ECMA-319. In this staggered method, a group of pairs of non-parallel magnetic stripes (servo stripes) disposed continuously in plural in a longitudinal direction of the magnetic tape is recorded so as to be shifted in a longitudinal direction of the magnetic tape for each servo band. Since this combination of shifting methods between adjacent servo bands is unique throughout the magnetic tape, it is possible to uniquely specify a servo band in a case of reading a servo pattern with two servo signal reading elements.

As shown in ECMA-319, information indicating a position of the magnetic tape in the longitudinal direction (also referred to as "longitudinal position (LPOS) information") is usually embedded in each servo band. This LPOS information is also recorded by shifting the positions of the pair of servo stripes in the longitudinal direction of the magnetic tape, as the UDIM information. Here, unlike the UDIM information, in this LPOS information, the same signal is recorded in each servo band.

It is also possible to embed, in the servo band, the other information different from the above UDIM information and LPOS information. In this case, the embedded information may be different for each servo band as the UDIM information or may be common to all servo bands as the LPOS information.

As a method of embedding information in the servo band, it is possible to employ a method other than the above. For example, a predetermined code may be recorded by thinning out a predetermined pair from the group of pairs of servo stripes.

A head for servo pattern forming head is called a servo write head. The servo write head has a pair of gaps corresponding to the pair of magnetic stripes as many as the number of servo bands. Usually, a core and a coil are connected to each pair of gaps, and by supplying a current pulse to the coil, a magnetic field generated in the core can cause generation of a leakage magnetic field in the pair of gaps. In a case of forming the servo pattern, by inputting a current pulse while running the magnetic tape on the servo write head, the magnetic pattern corresponding to the pair of gaps is transferred to the magnetic tape to form the servo pattern. A width of each gap can be appropriately set according to a density of the servo pattern to be formed. The width of each gap can be set to, for example, 1 µm or less, 1 to 10 µm, 10 µm or more, and the like.

Before the servo pattern is formed on the magnetic tape, the magnetic tape is usually subjected to demagnetization (erasing) processing. This erasing treatment can be performed by applying a uniform magnetic field to the magnetic tape using a direct current magnet or an alternating current magnet. The erasing treatment includes direct current (DC) erasing and alternating current (AC) erasing. The AC erasing is performed by gradually decreasing an intensity of the magnetic field while inverting a direction of the magnetic field applied to the magnetic tape. On the other hand, the DC erasing is performed by applying a one-direction magnetic field to the magnetic tape. As the DC erasing, there are two methods. A first method is horizontal DC erasing of applying a one-direction magnetic field along a longitudinal direction of the magnetic tape. A second method is vertical DC erasing of applying a one-direction magnetic field along a thickness direction of the magnetic tape. The erasing processing may be performed on the entire magnetic tape or may be performed for each servo band of the magnetic tape.

A direction of the magnetic field of the servo pattern to be formed is determined according to a direction of the erasing. For example, in a case where the horizontal DC erasing is performed on the magnetic tape, the servo pattern is formed so that the direction of the magnetic field is reverse to the direction of the erasing. Therefore, an output of a servo signal obtained by reading the servo pattern can be increased. As shown in JP2012-053940A, in a case where a magnetic pattern is transferred to, using the gap, a magnetic tape that has been subjected to vertical DC erasing, a servo signal obtained by reading the formed servo pattern has a monopolar pulse shape. On the other hand, in a case where a magnetic pattern is transferred to, using the gap, a magnetic tape that has been subjected to horizontal DC erasing, a servo signal obtained by reading the formed servo pattern has a bipolar pulse shape.

The magnetic tape is usually accommodated in a magnetic tape cartridge and the magnetic tape cartridge is mounted in the magnetic recording and reproducing apparatus.

In the magnetic tape cartridge, generally, the magnetic tape is accommodated inside a cartridge body in a state of being wound around a reel. The reel is rotatably provided inside the cartridge body. As the magnetic tape cartridge, a single reel type magnetic tape cartridge having one reel inside the cartridge body and a dual reel type magnetic tape cartridge having two reels inside the cartridge body are widely used. In a case where the single reel type magnetic tape cartridge is mounted on a magnetic recording and reproducing apparatus for recording and/or reproducing data on the magnetic tape, the magnetic tape is pulled out of the magnetic tape cartridge to be wound around the reel on the magnetic recording and reproducing apparatus side. A magnetic head is disposed on a magnetic tape transportation path from the magnetic tape cartridge to a winding reel. Feeding and winding of the magnetic tape are performed between a reel (supply reel) on the magnetic tape cartridge side and a reel (winding reel) on the magnetic recording and reproducing apparatus side. During this time, data is recorded and/or reproduced as the magnetic head and the magnetic layer surface of the magnetic tape come into contact with each other to be slid on each other. With respect to this, in the dual reel type magnetic tape cartridge, both reels of the supply reel and the winding reel are provided in the magnetic tape cartridge. The magnetic tape cartridge may be either a single reel type or a dual reel type magnetic tape cartridge. Well-known technologies can be applied to other details of the magnetic tape cartridge.

Magnetic Recording and Reproducing Apparatus

Another aspect of the present invention relates to a magnetic recording and reproducing apparatus comprising: the magnetic recording medium described above; and a magnetic head.

In the present invention and this specification, the "magnetic recording and reproducing apparatus" means an apparatus capable of performing at least one of the recording of data on the magnetic recording medium or the reproducing of data recorded on the magnetic recording medium. Such an apparatus is generally called a drive. The magnetic recording and reproducing apparatus can be a sliding type magnetic recording and reproducing apparatus. The sliding type magnetic recording and reproducing apparatus is an apparatus in which the magnetic layer surface and the magnetic head come into contact with each other to be slid on each other, in a case of performing the recording of data on the magnetic recording medium and/or reproducing of the recorded data.

The magnetic head included in the magnetic recording and reproducing apparatus can be a recording head capable of performing the recording of data on the magnetic recording medium, or can be a reproducing head capable of performing the reproducing of data recorded on the magnetic recording medium. In addition, in an aspect, the magnetic recording and reproducing apparatus can include both of a recording head and a reproducing head as separate magnetic heads. In another aspect, the magnetic head included in the magnetic recording and reproducing apparatus can have a configuration that both of an element for recording data (recording element) and an element for reproducing data (reproducing element) are included in one magnetic head. Hereinafter, the element for recording and the element for reproducing data are collectively referred to as an "element for data". As the reproducing head, a magnetic head (MR head) including a magnetoresistive (MR) element capable of sensitively reading data recorded on the magnetic tape as a reproducing element is preferable. As the MR head, various known MR heads such as an anisotropic magnetoresistive (AMR) head, a giant magnetoresistive (GMR) head, and a tunnel magnetoresistive (TMR) head can be used. In addition, the magnetic head which performs the recording of data and/or the reproducing of data may include a servo signal reading element. Alternatively, as a head other than the magnetic head which performs the recording of data and/or the reproducing of data, a magnetic head (servo head) comprising a servo signal reading element may be included in the magnetic recording and reproducing apparatus. For example, a magnetic head that records data and/or reproduces recorded data (hereinafter also referred to as "recording and reproducing head".) can include two servo signal reading elements, and the two servo signal reading elements can read two adjacent servo bands simultaneously. One or a plurality of elements for data can be disposed between the two servo signal reading elements.

In the magnetic recording and reproducing apparatus, recording of data on the magnetic recording medium and/or reproducing of data recorded on the magnetic recording medium can be performed as the magnetic layer surface of the magnetic recording medium and the magnetic head come into contact with each other to be slid on each other. The above magnetic recording and reproducing apparatus needs only to include the magnetic recording medium according to an aspect of the present invention, and the well-known technology can be applied to the others.

For example, in a case where data is recorded on the magnetic recording medium on which a servo pattern is formed and/or recorded data is reproduced, first, tracking is performed using a servo signal obtained by reading the servo pattern. That is, by causing the servo signal reading element to follow a predetermined servo track, the element for data is controlled to pass over the target data track. Displacement of the data track is performed by changing a servo track to be read by the servo signal reading element in a tape width direction.

The recording and reproducing head can also perform recording and/or reproducing with respect to other data bands. In this case, the servo signal reading element may be displaced to a predetermined servo band using the above described UDIM information, and tracking for the servo band may be started.

EXAMPLES

Hereinafter, the present invention will be described based on examples. Here, the present invention is not limited to aspects shown in the examples. Unless otherwise specified, "parts" and "%" in the following description indicate "parts by mass" and "mass %". eq is an equivalent and is a unit that cannot be converted into an SI unit. The processes and evaluations in the following description were performed in an environment of an atmosphere temperature of 23° C.±1° C., unless otherwise specified.

Example 1

List of each layer forming composition is shown below.
List of Magnetic Layer Forming Composition
Magnetic Liquid
Ferromagnetic powder (see Table 1): 100.0 parts
Oleic acid: 2.0 parts
Vinyl chloride copolymer (MR-104 manufactured by Kaneka Corporation): 10.0 parts
$SO_3Na$ group-containing polyurethane resin: 4.0 parts (weight-average molecular weight: 70,000, $SO_3Na$ group: 0.07 meq/g)
Polyalkyleneimine polymer (synthetic product obtained by the method disclosed in paragraphs 0115 to 0123 of JP2016-051493A): 6.0 parts
Methyl ethyl ketone: 150.0 parts
Cyclohexanone: 150.0 parts
Abrasive Liquid
α-alumina (Brunauer-Emmett-Teller (BET) specific surface area: 19 $m^2/g$): 6.0 parts
$SO_3Na$ group-containing polyurethane resin: 0.6 parts (weight-average molecular weight: 70,000, $SO_3Na$ group: 0.1 meq/g)
2,3-dihydroxynaphthalene: 0.6 parts
Cyclohexanone: 23.0 parts
Silica Sol
Colloidal silica (average particle size: 120 nm): 2.0 parts
Methyl ethyl ketone: 8.0 parts
Other Components
Stearic acid: 3.0 parts
Stearic acid amide: 0.3 parts
Butyl stearate: 6.0 parts
Methyl ethyl ketone: 110.0 parts
Cyclohexanone: 110.0 parts
Polyisocyanate (CORONATE (registered trademark) L manufactured by Tosoh Corporation): 3.0 parts
List of Non-Magnetic Layer Forming Composition
Non-magnetic inorganic powder
α-iron oxide (average particle size: 10 nm, BET specific surface area: 75 $m^2/g$): 100.0 parts
Carbon black (average particle size: 20 nm): 25.0 parts
$SO_3Na$ group-containing polyurethane resin (weight-average molecular weight: 70,000, $SO_3Na$ group: 0.2 meq/g): 18.0 parts
Stearic acid: 1.0 part
Cyclohexanone: 300.0 parts
Methyl ethyl ketone: 300.0 parts
List of Back Coating Layer Forming Composition
Protrusion Forming Agent Liquid
Protrusion forming agent (see Table 1): 1.3 parts
Methyl ethyl ketone: 9.0 parts
Cyclohexanone: 6.0 parts
Other Components
α-iron oxide: see Table 1
   Average particle size (average long axis length): 150 nm
   Average acicular ratio: 7
   BET specific surface area: 52 $m^2/g$
Carbon black: see Table 1
   Average particle size: 20 nm
Vinyl chloride copolymer (MR-104 manufactured by Kaneka Corporation): 12.0 parts
$SO_3Na$ group-containing polyurethane resin: 6.0 parts
Phenylphosphonic acid: 3.0 parts
Cyclohexanone: 155.0 parts
Methyl ethyl ketone: 155.0 parts
Stearic acid: 3.0 parts
Butyl stearate: 3.0 parts
Polyisocyanate: 5.0 parts
Cyclohexanone: 200.0 parts Preparation of Magnetic Layer Forming Composition A magnetic layer forming composition was prepared by the following method.

Various components of the magnetic liquid were dispersed (bead dispersion) for 24 hours using a batch type vertical sand mill to prepare a magnetic liquid. As dispersed beads, zirconia beads having a bead diameter of 0.5 mm were used.

Various components of the above abrasive liquid were mixed and then the mixture was put in a horizontal beads mill dispersing device together with zirconia beads having a bead diameter of 0.3 mm, and a bead volume/(an abrasive liquid volume+a bead volume) was adjusted to be 80%, and beads mill dispersion processing was performed for 120 minutes. The liquid after the processing was taken out and subjected to ultrasonic dispersion filtration processing using a flow type ultrasonic dispersion filtration device. Thereby, the abrasive liquid was prepared.

The prepared magnetic liquid and abrasive liquid, and the silica sol and other components were put into a dissolver or a stirrer and stirred for 30 minutes at a circumferential speed of 10 m/sec, and subjected to a treatment of 3 passes at a flow rate of 7.5 kg/min by a flow type ultrasonic dispersing device, and then a magnetic layer forming composition was prepared by filtration through a filter having a pore diameter of 1 μm.

Preparation of Non-Magnetic Layer Forming Composition

Various components of the above non-magnetic layer forming composition were dispersed using zirconia beads having a bead diameter of 0.1 mm by a batch type vertical sand mill for 24 hours, and then filtered using a filter having a pore diameter of 0.5 μm. Thereby, the non-magnetic layer forming composition was prepared.

Preparation of Back Coating Layer Forming Composition

The components of the above protrusion forming agent liquid were mixed and then the mixture was subjected to an ultrasonic treatment (dispersion treatment) for 60 minutes at an ultrasonic output of 500 watts per 200 cc by a horn type ultrasonic dispersing device, and the obtained dispersion liquid was filtered using a filter having a pore diameter of 0.5 μm. Thereby, the protrusion forming agent liquid was prepared.

The protrusion forming agent liquid and components other than a lubricant (stearic acid and butyl stearate), polyisocyanate, and 200.0 parts of cyclohexanone among the other components of the above back coating layer forming composition were kneaded and diluted by an open kneader, and then subjected to a dispersion treatment of 12 passes using a horizontal beads mill dispersing device and zirconia beads having a bead diameter of 1 mm, by setting a bead filling percentage to 80 volume %, a circumferential speed of a rotor distal end to 10 m/sec, and a retention time for 1 pass to 2 minutes. A lubricant (stearic acid and butyl stearate), polyisocyanate, and 200.0 parts of cyclohexanone were added to the obtained dispersion liquid and stirred with a dissolver. The dispersion liquid obtained as described above was filtered using a filter having a pore diameter of 1 μm. Thereby, the back coating layer forming composition was prepared.

Manufacturing of Magnetic Tape

The non-magnetic layer forming composition prepared in the above section was applied onto a surface of a biaxially stretched polyethylene naphthalate support having a thickness of 5.0 μm and was dried so that a thickness after drying becomes 400 nm, and thus a non-magnetic layer was formed. After that, the magnetic layer forming composition prepared in the above section was applied onto a surface of the non-magnetic layer so that a thickness after drying becomes 70 nm, and thus a coating layer was formed. While this coating layer of the magnetic layer forming composition is in a wet (undried) state, a vertical orientation treatment was performed in which a magnetic field of a magnetic field intensity of 0.3 T was applied in a direction perpendicular to a surface of the coating layer, and then the surface of the coating layer was dried. Thereafter, the back coating layer forming composition prepared in the above section was applied onto an opposite surface of the support so that the thickness after drying is a thickness of 0.2 μm, and then was dried. Thereby, a magnetic tape original roll was manufactured.

The manufactured magnetic tape original roll was subjected to a calendering treatment (surface smoothing treatment) using a 7-stage calender roll formed of only metal rolls at a calender speed of 100 m/min, a linear pressure of 294 kN/m, and a surface temperature of a calendering roll of 100° C. Then, a heat treatment was performed in an environment of an atmosphere temperature of 70° C. for 36 hours. After the heat treatment, the magnetic tape original roll was slit by a cutter to have ½ inches width, and the magnetic layer surface was cleaned with a tape cleaning device in which a non-woven fabric and a razor blade are attached to a device including a feeding and winding device of the slit so as to press the magnetic layer surface. Thereby, the magnetic tape was obtained.

Examples 2 to 9 and Comparative Examples 1 to 5

A magnetic tape was manufactured in the same manner as in Example 1, except that the type of the ferromagnetic powder, the type of the protrusion forming agent included in the back coating layer forming composition, the amount of α-iron oxide, and/or the amount of carbon black were changed as shown in Table 1. In Comparative Example 1, a back coating layer forming composition was prepared without using a protrusion forming agent liquid.

Protrusion Forming Agent

A protrusion forming agent used in preparation of a back coating layer forming composition for manufacturing magnetic tapes of Examples or Comparative Examples is as follows. A protrusion forming agent A and a protrusion forming agent C are particles having a low surface smoothness of the particle surface. A particle shape of a protrusion forming agent B is a cocoon shape. A particle shape of a protrusion forming agent D is a so-called amorphous. A particle shape of a protrusion forming agent E is a shape close to a true sphere.

Protrusion forming agent A: ATLAS (composite particle of silica and polymer) manufactured by Cabot Corporation, average particle size of 100 nm Protrusion forming agent B: TGC6020N (silica particle) manufactured by Cabot Corporation, average particle size of 140 nm Protrusion forming agent C: Cataloid (an aqueous dispersion sol of a silica particle; as a protrusion forming agent for preparing a back coating layer forming composition, a dry solid obtained by heating the aqueous dispersion sol to remove a solvent is used) manufactured by JGC Catalysts Co., Ltd., average particle size of 120 nm Protrusion forming agent D: Asahi #52 (carbon black) manufactured by Asahi Carbon Co., Ltd., average particle size of 60 nm Protrusion forming agent E: Quartron PL-10L (an aqueous dispersion sol of a silica particle; as a protrusion forming agent for preparing a back coating layer forming composition, a dry solid obtained by heating the aqueous dispersion sol to remove a solvent is used) manufactured by Fuso Chemical Industry Co., Ltd., average particle size of 130 nm Ferromagnetic Powder In Table 1, "BaFe" indicates hexagonal barium ferrite powder having an average particle size (average plate diameter) of 21 nm. "SrFe1" and "SrFe2" indicate hexagonal strontium ferrite powder, and "ε-iron oxide" indicates ε-iron oxide powder.

An activation volume and an anisotropy constant Ku of various types of ferromagnetic powder described below are values obtained by the method described above using a vibrating sample magnetometer (manufactured by Toei Industry Co., Ltd.) for each ferromagnetic powder.

A mass magnetization σs is a value measured at a magnetic field intensity of 15 kOe using a vibrating sample magnetometer (manufactured by Toei Industry Co., Ltd.).

Manufacturing Method 1 of Hexagonal Strontium Ferrite Powder

"SrFe1" shown in Table 1 is hexagonal strontium ferrite powder manufactured by the following method.

1707 g of $SrCO_3$, 687 g of $H_3BO_3$, 1120 g of $Fe_2O_3$, 45 g of $Al(OH)_3$, 24 g of $BaCO_3$, 13 g of $CaCO_3$, and 235 g of $Nd_2O_3$ were weighed and mixed by a mixer to obtain a raw material mixture.

The obtained raw material mixture was melted in a platinum crucible at a melting temperature of 1390° C., and a hot water outlet provided at a bottom of the platinum crucible was heated while stirring a melt, and the melt was discharged in a rod shape at about 6 g/sec. Hot water was rolled and quenched by a water-cooled twin roller to manufacture an amorphous body.

280 g of the manufactured amorphous body was charged into an electric furnace, was heated to 635° C. (crystallization temperature) at a heating rate of 3.5° C./min, and was kept at the same temperature for 5 hours to precipitate (crystallize) hexagonal strontium ferrite particles.

Next, a crystallized product obtained above including hexagonal strontium ferrite particles was coarsely pulverized in a mortar, and 1000 g of zirconia beads having a particle diameter of 1 mm and 800 mL of an acetic acid aqueous solution of 1% concentration were added to the crystallized product in a glass bottle, to be dispersed by a paint shaker for 3 hours. Thereafter, the obtained dispersion liquid was separated from the beads, to be put in a stainless beaker. The dispersion liquid was statically left at a liquid temperature of 100° C. for 3 hours and subjected to a dissolving process of a glass component, and then the crystallized product was sedimented by a centrifugal separator to be washed by repeatedly performing decantation and was dried in a heating furnace at an internal temperature of the furnace of 110° C. for 6 hours to obtain hexagonal strontium ferrite powder.

The hexagonal strontium ferrite powder ("SrFe1" in Table 1) obtained above had an average particle size of 18 nm, an activation volume of 902 $nm^3$, an anisotropy constant Ku of $2.2 \times 10^5$ $J/m^3$, and a mass magnetization σs of 49 $A \cdot m^2/kg$.

12 mg of sample powder was taken from the hexagonal strontium ferrite powder obtained above, elemental analysis of the filtrated solution obtained by partially dissolving this sample powder under dissolution conditions illustrated above was performed by an ICP analyzer, and a surface layer portion content of a neodymium atom was determined.

Separately, 12 mg of sample powder was taken from the hexagonal strontium ferrite powder obtained above, elemental analysis of the filtrated solution obtained by totally dissolving this sample powder under dissolution conditions illustrated above was performed by an ICP analyzer, and a bulk content of a neodymium atom was determined.

A content (bulk content) of a neodymium atom with respect to 100 at % of an iron atom in the hexagonal strontium ferrite powder obtained above was 2.9 at %. A surface layer portion content of a neodymium atom was 8.0 at %. It was confirmed that a ratio between a surface layer portion content and a bulk content, that is, "surface layer portion content/bulk content" was 2.8, and a neodymium atom was unevenly distributed in a surface layer of a particle.

The fact that the powder obtained above shows a crystal structure of hexagonal ferrite was confirmed by performing scanning with CuKα rays under conditions of a voltage of 45 kV and an intensity of 40 mA and measuring an X-ray diffraction pattern under the following conditions (X-ray diffraction analysis). The powder obtained above showed a crystal structure of hexagonal ferrite of a magnetoplumbite type (M type). A crystal phase detected by X-ray diffraction analysis was a single phase of a magnetoplumbite type.

PANalytical X'Pert Pro diffractometer, PIXcel detector
Soller slit of incident beam and diffracted beam: 0.017 radians
Fixed angle of dispersion slit: ¼ degrees
Mask: 10 mm
Anti-scattering slit: ¼ degrees
Measurement mode: continuous
Measurement time per stage: 3 seconds
Measurement speed: 0.017 degrees per second
Measurement step: 0.05 degrees Manufacturing Method 2 of Hexagonal Strontium Ferrite Powder "SrFe2" shown in Table 1 is hexagonal strontium ferrite powder manufactured by the following method.

1725 g of SrCO3, 666 g of H3BO3, 1332 g of Fe2O3, 52 g of Al(OH)3, 34 g of CaCO3, and 141 g of BaCO3 were weighed and mixed by a mixer to obtain a raw material mixture.

The obtained raw material mixture was dissolved in a platinum crucible at a melting temperature of 1380° C., and a hot water outlet provided at a bottom of the platinum crucible was heated while stirring a melt, and the melt was discharged in a rod shape at about 6 g/sec. Hot water was rolled and quenched by a water-cooled twin roller to manufacture an amorphous body.

280 g of the obtained amorphous body was charged into an electric furnace, was heated to 645° C. (crystallization temperature), and was kept at the same temperature for 5 hours to precipitate (crystallize) hexagonal strontium ferrite particles.

Next, a crystallized product obtained above including hexagonal strontium ferrite particles was coarsely pulverized in a mortar, and 1000 g of zirconia beads having a particle diameter of 1 mm and 800 mL of an acetic acid aqueous solution of 1% concentration were added to the crystallized product in a glass bottle, to be dispersed by a paint shaker for 3 hours. Thereafter, the obtained dispersion liquid was separated from the beads, to be put in a stainless beaker. The dispersion liquid was statically left at a liquid temperature of 100° C. for 3 hours and subjected to a dissolving process of a glass component, and then the crystallized product was sedimented by a centrifugal separator to be washed by repeatedly performing decantation and was dried in a heating furnace at an internal temperature of the furnace of 110° C. for 6 hours to obtain hexagonal strontium ferrite powder.

The obtained hexagonal strontium ferrite powder ("SrFe2" in Table 1) had an average particle size of 19 nm, an activation volume of 1102 $nm^3$, an anisotropy constant Ku of $2.0 \times 10^5$ $J/m^3$, and a mass magnetization σs of 50 A·$m^2$/kg.

Manufacturing Method of ε-Iron Oxide Powder "ε-iron oxide" shown in Table 1 is ε-iron oxide powder manufactured by the following method.

8.3 g of iron(III) nitrate nonahydrate, 1.3 g of gallium(III) nitrate octahydrate, 190 mg of cobalt(II) nitrate hexahydrate, 150 mg of titanium(IV) sulfate, and 1.5 g of polyvinylpyrrolidone (PVP) were dissolved in 90 g of pure water, and while the dissolved product was stirred using a magnetic stirrer, 4.0 g of an aqueous ammonia solution having a concentration of 25% was added to the dissolved product under a condition of an atmosphere temperature of 25° C. in an air atmosphere, and the dissolved product was stirred for 2 hours while maintaining a temperature condition of the atmosphere temperature of 25° C. A citric acid aqueous solution obtained by dissolving 1 g of citric acid in 9 g of pure water was added to the obtained solution, and the mixture was stirred for 1 hour. The powder sedimented after stirring was collected by centrifugal separation, was washed with pure water, and was dried in a heating furnace at a furnace temperature of 80° C.

800 g of pure water was added to the dried powder, and the powder was dispersed again in water to obtain dispersion liquid. The obtained dispersion liquid was heated to a liquid temperature of 50° C., and 40 g of an aqueous ammonia solution having a concentration of 25% was dropwise added with stirring. After stirring for 1 hour while maintaining the temperature at 50° C., 14 mL of tetraethoxysilane (TEOS) was dropwise added and was stirred for 24 hours. Powder sedimented by adding 50 g of ammonium sulfate to the obtained reaction solution was collected by centrifugal separation, was washed with pure water, and was dried in a heating furnace at a furnace temperature of 80° C. for 24 hours to obtain a ferromagnetic powder precursor.

The obtained ferromagnetic powder precursor was loaded into a heating furnace at a furnace temperature of 1000° C. in an air atmosphere and was heat-treated for 4 hours.

The heat-treated ferromagnetic powder precursor was put into an aqueous solution of 4 mol/L sodium hydroxide (NaOH), and the liquid temperature was maintained at 70° C. and was stirred for 24 hours, whereby a silicic acid compound as an impurity was removed from the heat-treated ferromagnetic powder precursor.

Thereafter, the ferromagnetic powder from which the silicic acid compound was removed was collected by centrifugal separation, and was washed with pure water to obtain a ferromagnetic powder.

The composition of the obtained ferromagnetic powder that was checked by high-frequency inductively coupled plasma-optical emission spectrometry (ICP-OES) has Ga, Co, and a Ti substitution type ε-iron oxide (ε-$Ga_{0.28}Co_{0.05}T_{0.05}Fe_{1.62}O_3$). In addition, X-ray diffraction analysis is performed under the same condition as that described above for the manufacturing method 1 of hexagonal strontium ferrite powder, and from a peak of an X-ray diffraction pattern, it is checked that the obtained ferromagnetic powder does not include α-phase and γ-phase crystal structures, and has a single-phase and ε-phase crystal structure (ε-iron oxide type crystal structure).

The obtained ε-iron oxide powder ("ε-iron oxide" in Table 1) had an average particle size of 12 nm, an activation volume of 746 $nm^3$, an anisotropy constant Ku of $1.2 \times 10^5$ $J/m^3$, and a mass magnetization σs of 16 A·$m^2$/kg.

Evaluation Method (1) Difference ($S_{0.5}-S_{13.5}$)

Using a tape spacing analyzer ((TSA) manufactured by Micro Physics)), the spacings $S_{0.5}$ and $S_{13.5}$ after n-hexane cleaning were measured by the following method, and the difference ($S_{0.5}-S_{13.5}$) from the measured values was calculated.

Five sample pieces each having a length of 5 cm were cut out from each magnetic tape of Examples and Comparative Examples, and each sample piece was subjected to n-hexane cleaning by the method described above, and then $S_{0.5}$ and $S_{13.5}$ were obtained.

In a state where a glass plate (a glass plate manufactured by Thorlabs, Inc. (model number: WG10530)) provided in TSA is disposed on the back coating layer surface of the magnetic tape (that is, the sample piece), using a urethane hemisphere provided in the TSA as a pressing member, the hemisphere was pressed against the magnetic layer surface of the magnetic tape at a pressure of 0.5 atm. In this state, white light was emitted from a stroboscope provided in the TSA to a certain area (150,000 to 200,000 $\mu m^2$) on the back coating layer surface of the magnetic tape through a glass plate, and the obtained reflected light was received by a charge-coupled device (CCD) through an interference filter (a filter that selectively transmits light having a wavelength of 633 nm), and thus an interference fringe image generated by an unevenness of this area was obtained.

This image was divided into 300,000 points to obtain a distance (spacing) from the surface of the glass plate on the magnetic tape side to the back coating layer surface of the magnetic tape at each point, and this was used as a histogram. Thus, a mode value of the histogram was obtained as a spacing.

The same sample piece was further pressed, and a spacing was determined by the same method as described above under a pressure of 13.5 atm.

An arithmetic average of the spacings obtained under a pressure of 0.5 atm after n-hexane cleaning for the five sample pieces is defined as a spacing $S_{0.5}$, and an arithmetic average of the spacings obtained under a pressure of 13.5 atm after n-hexane cleaning for the five sample pieces is defined as a spacing $S_{13.5}$.

(2) Reproduction Output Decrease

Each magnetic tape of Examples and Comparative Examples was stored for 24 hours in a thermo box of which the inside was maintained at a temperature of 50° C. and a relative humidity of 80% while being accommodated in a single reel type magnetic tape cartridge. Thereafter, the magnetic tape cartridge was taken out from the thermo box (outside air is at a temperature of 23° C. and a relative humidity of 50%), and was put in a thermo room of which the inside was maintained at a temperature of 10° C. and a relative humidity of 85% within one minute. Thereafter, within 30 minutes, recording and reproduction were performed by the following method in the thermo room using a reel tester having ½ inches with a fixed magnetic head.

A relative speed between the magnetic head and the magnetic tape was set to 5.5 m/sec, a metal-in-gap (MIG) head (a gap length of 0.15 μm and a track width of 1.0 μm) was used for recording, and a recording current was set as an optimal recording current of each magnetic tape. A giant-magnetoresistive (GMR) head having an element thickness of 15 nm, a shield interval of 0.1 μm, and a lead width of 0.5 μm was used for reproduction. A signal having a linear recording density of 300 kfci was recorded, and measurement regarding a reproduction signal was performed with a spectrum analyzer manufactured by Shibasoku Co., Ltd. Regarding the signal, a signal which was sufficiently stabilized after starting the running of the magnetic tape was used. The unit kfci is a unit of a linear recording density (cannot be converted into an SI unit system).

Under the conditions described above, reproduction was repeated for 3000 passes at 1000 m per pass. An output value of a carrier signal of the first pass and an output value of a carrier signal of the 3000-th pass were respectively obtained, and a difference "(output value of 3000-th pass)−(output value of first pass)" was shown in Table 1 as a reproduction output decrease.

The above results are shown in Table 1.

TABLE 1

| | Magnetic layer | Back coating layer | | | | | | |
|---|---|---|---|---|---|---|---|---|
| | Ferromagnetic powder | α-iron oxide (parts by mass) | Carbon black (parts by mass) | Protrusion forming agent | $S_{0.5} - S_{13.5}$ (nm) | $S_{0.5}$ (nm) | $S_{13.5}$ (nm) | Reproduction output decrease |
| Example 1 | BaFe | 60.0 | 40.0 | Protrusion forming agent A | 1 | 42 | 41 | −0.1 dB |
| Example 2 | BaFe | 60.0 | 40.0 | Protrusion forming agent B | 2 | 42 | 40 | −0.2 dB |
| Example 3 | BaFe | 60.0 | 40.0 | Protrusion forming agent C | 3 | 43 | 40 | −0.4 dB |
| Example 4 | BaFe | 40.0 | 60.0 | Protrusion forming agent A | 2 | 58 | 56 | −0.3 dB |
| Example 5 | BaFe | 0 | 100.0 | Protrusion forming agent A | 2 | 80 | 78 | −0.4 dB |
| Example 6 | BaFe | 80.0 | 20.0 | Protrusion forming agent A | 3 | 25 | 22 | −0.4 dB |
| Example 7 | SrFe1 | 60.0 | 40.0 | Protrusion forming agent A | 1 | 42 | 41 | −0.1 dB |
| Example 8 | SrFe2 | 60.0 | 40.0 | Protrusion forming agent A | 1 | 42 | 41 | −0.1 dB |
| Example 9 | ε-iron oxide | 60.0 | 40.0 | Protrusion forming agent A | 1 | 42 | 41 | −0.1 dB |
| Comparative Example 1 | BaFe | 60.0 | 40.0 | None | 6 | 39 | 33 | −0.6 dB |
| Comparative Example 2 | BaFe | 60.0 | 40.0 | Protrusion forming agent D | 5 | 44 | 39 | −0.6 dB |
| Comparative Example 3 | BaFe | 60.0 | 40.0 | Protrusion forming agent E | 7 | 46 | 39 | −0.7 dB |
| Comparative Example 4 | BaFe | 40.0 | 60.0 | Protrusion forming agent D | 7 | 52 | 45 | −0.7 dB |
| Comparative Example 5 | BaFe | 80.0 | 20.0 | Protrusion forming agent D | 6 | 31 | 25 | −0.6 dB |

From the results shown in Table 1, it can be confirmed that the magnetic tapes of Examples 1 to 9 in which the difference ($S_{0.5}-S_{13.5}$) measured on the back coating layer surface is 3 nm or less have less decrease in reproduction output than the magnetic tapes of Comparative Examples 1 to 5 even though reproduction is repeated under an environment of a low temperature and a high humidity after storage under an environment of a high temperature.

An aspect of the present invention is effective in a technical field of magnetic recording media for various data storages.

What is claimed is:

1. A magnetic recording medium comprising:
a non-magnetic support;
a magnetic layer that includes ferromagnetic powder on one surface side of the non-magnetic support; and
a back coating layer that includes non-magnetic powder on the other surface side of the non-magnetic support, wherein a difference $S_{0.5}-S_{13.5}$ between a spacing $S_{0.5}$ measured on a surface of the back coating layer by optical interferometry under a pressure of 0.5 atm after n-hexane cleaning and a spacing $S_{13.5}$ measured on the surface of the back coating layer by optical interferometry under a pressure of 13.5 atm after n-hexane cleaning is 3 nm or less.

2. The magnetic recording medium according to claim 1, wherein the difference is 1 nm or more and 3 nm or less.

3. The magnetic recording medium according to claim 1, wherein the spacing $S_{0.5}$ is 20 nm or more and 90 nm or less.

4. The magnetic recording medium according to claim 1, wherein the spacing $S_{13.5}$ is 20 nm or more and 90 nm or less.

5. The magnetic recording medium according to claim 1, wherein the back coating layer includes an inorganic oxide-based particle.

6. The magnetic recording medium according to claim 5, wherein the inorganic oxide-based particle is a composite particle of an inorganic oxide and a polymer.

7. The magnetic recording medium according to claim 1, wherein the back coating layer has a thickness of 0.5 μm or less.

8. The magnetic recording medium according to claim 1, further comprising:
a non-magnetic layer including non-magnetic powder between the non-magnetic support and the magnetic layer.

9. The magnetic recording medium according to claim 1, wherein the magnetic recording medium is a magnetic tape.

10. A magnetic recording and reproducing apparatus comprising:
a magnetic recording medium; and
a magnetic head,
wherein the magnetic recording medium is a magnetic recording medium comprising:
a non-magnetic support;
a magnetic layer that includes ferromagnetic powder on one surface side of the non-magnetic support; and
a back coating layer that includes non-magnetic powder on the other surface side of the non-magnetic support, wherein a difference $S_{0.5}-S_{13.5}$ between a spacing $S_{0.5}$ measured on a surface of the back coating layer by optical interferometry under a pressure of 0.5 atm after n-hexane cleaning and a spacing $S_{13.5}$ measured on the surface of the back coating layer by optical interferometry under a pressure of 13.5 atm after n-hexane cleaning is 3 nm or less.

11. The magnetic recording and reproducing apparatus according to claim 10, wherein the difference is 1 nm or more and 3 nm or less.

12. The magnetic recording and reproducing apparatus according to claim 10,
wherein the spacing $S_{0.5}$ is 20 nm or more and 90 nm or less.

13. The magnetic recording and reproducing apparatus according to claim 10,
wherein the spacing $S_{13.5}$ is 20 nm or more and 90 nm or less.

14. The magnetic recording and reproducing apparatus according to claim 10,
wherein the back coating layer includes an inorganic oxide-based particle.

15. The magnetic recording and reproducing apparatus according to claim 14,
wherein the inorganic oxide-based particle is a composite particle of an inorganic oxide and a polymer.

16. The magnetic recording and reproducing apparatus according to claim 10,
wherein the back coating layer has a thickness of 0.5 μm or less.

17. The magnetic recording and reproducing apparatus according to claim 10,
wherein the magnetic recording medium further comprises a non-magnetic layer including non-magnetic powder between the non-magnetic support and the magnetic layer.

18. The magnetic recording and reproducing apparatus according to claim 10,
wherein the magnetic recording medium is a magnetic tape.

* * * * *